(12) United States Patent
Sakakibara et al.

(10) Patent No.: US 8,508,184 B2
(45) Date of Patent: Aug. 13, 2013

(54) COIL UNIT, NON-CONTACT POWER TRANSMISSION DEVICE, NON-CONTACT POWER RECEPTION DEVICE, NON-CONTACT POWER SUPPLY SYSTEM, AND VEHICLE

(75) Inventors: Hiroyuki Sakakibara, Hekinan (JP); Shinji Ichikawa, Toyota (JP)

(73) Assignees: Toyota Jidosha Kabushiki Kaisha, Toyota (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 13/643,480

(22) PCT Filed: Apr. 21, 2011

(86) PCT No.: PCT/IB2011/000869
§ 371 (c)(1),
(2), (4) Date: Oct. 25, 2012

(87) PCT Pub. No.: WO2011/135424
PCT Pub. Date: Nov. 3, 2011

(65) Prior Publication Data
US 2013/0038281 A1 Feb. 14, 2013

(30) Foreign Application Priority Data
Apr. 27, 2010 (JP) ................................. 2010-102301

(51) Int. Cl.
*H02J 7/00* (2006.01)
*H01F 27/42* (2006.01)

(52) U.S. Cl.
USPC ........... 320/108; 320/109; 307/104; 180/65.1

(58) Field of Classification Search
CPC ........................................................ H02J 7/025
USPC ................ 320/108, 109; 180/65.1; 307/104
See application file for complete search history.

(56) References Cited

U.S. PATENT DOCUMENTS

| | | | |
|---|---|---|---|
| 6,252,386 B1 * | 6/2001 | Minami et al. ................ | 323/355 |
| 7,880,337 B2 * | 2/2011 | Farkas ........................... | 307/104 |
| 8,219,154 B2 * | 7/2012 | Wakamatsu ................... | 455/572 |
| 8,294,419 B2 * | 10/2012 | Sasaki ............................ | 320/108 |
| 8,310,202 B2 * | 11/2012 | Scudiere ........................ | 320/108 |
| 8,400,104 B2 * | 3/2013 | Adamczyk et al. ........... | 320/108 |
| 2009/0244866 A1 * | 10/2009 | Kawano et al. ................ | 361/765 |

(Continued)

FOREIGN PATENT DOCUMENTS

| | | |
|---|---|---|
| JP | A-11-32452 | 2/1999 |
| JP | A-2009-106136 | 5/2009 |
| WO | WO 2009/122355 A2 | 10/2009 |
| WO | WO 2011/077488 A1 | 6/2011 |

*Primary Examiner* — Drew A Dunn
*Assistant Examiner* — Nathaniel Pelton
(74) *Attorney, Agent, or Firm* — Oliff & Berridge, PLC

(57) ABSTRACT

A coil unit performs at least one of transmission and reception of electric power using electromagnetic resonance between the coil unit and a primary resonance coil disposed to face the coil unit. The coil unit includes a secondary resonance coil that includes a plurality of coils, and that electromagnetically resonates with the primary resonance coil. A first coil among the plurality of coils is disposed in a manner such that a magnetic field generated by the first coil has a phase opposite to a phase of a magnetic field generated by at least one coil other than the first coil among the plurality of coils, with respect to a plane that faces the primary resonance coil.

24 Claims, 12 Drawing Sheets

(56) References Cited

U.S. PATENT DOCUMENTS

| | | | |
|---|---|---|---|
| 2010/0065352 A1* | 3/2010 | Ichikawa | 180/65.8 |
| 2010/0117596 A1* | 5/2010 | Cook et al. | 320/108 |
| 2010/0225271 A1 | 9/2010 | Oyobe et al. | |
| 2010/0277121 A1* | 11/2010 | Hall et al. | 320/108 |
| 2011/0163542 A1* | 7/2011 | Farkas | 290/2 |
| 2011/0181240 A1* | 7/2011 | Baarman et al. | 320/108 |
| 2011/0221387 A1* | 9/2011 | Steigerwald et al. | 320/108 |
| 2012/0032525 A1 | 2/2012 | Oyobe et al. | |
| 2012/0169139 A1 | 7/2012 | Kudo | |

* cited by examiner (1) SAME PHASE : I1=+α[A], I2=+α[A]
(2) OPPOSITE PHASES : I1=+α[A], I2=-α[A]

COIL UNIT, NON-CONTACT POWER TRANSMISSION DEVICE, NON-CONTACT POWER RECEPTION DEVICE, NON-CONTACT POWER SUPPLY SYSTEM, AND VEHICLE

BACKGROUND OF THE INVENTION

1. Field of the Invention

The invention relates to a coil unit, a non-contact power transmission device, a non-contact power reception device, a non-contact power supply system, and a vehicle. More particularly, the invention relates to a coil structure that reduces leakage electromagnetic fields that occur when electric power is supplied in a non-contact manner using electromagnetic resonance.

2. Description of the Related Art

Electrically-driven vehicles, such as electric vehicles and hybrid vehicles, have received much attention, as environmentally-friendly vehicles. Each of the electrically-driven vehicles is provided with a motor that generates drive power for driving the vehicle, and a rechargeable power storage device that stores electric power to be supplied to the motor. The hybrid vehicles include a vehicle provided with an internal combustion engine that serves as a power source, in addition to the motor; and a vehicle provided with a fuel cell that serves as a DC power source for driving the vehicle, in addition to the power storage device.

Among hybrid vehicles, there is a known hybrid vehicle provided with a power storage device that is charged with electric power supplied from a power source outside the vehicle, like the electric vehicles. For example, a so-called "plug-in hybrid vehicle" is known. In the plug-in hybrid vehicle, the power storage device is charged with electric power supplied from a power source at home, by connecting a power source outlet provided in a house to a charging port provided in the vehicle using a charging cable.

On the other hand, wireless power transmission has recently received attention as a power transmission method without using a power source cord or a power transmission cable. Three technologies are known as wireless power transmission technologies that are prevailing. The three technologies include a technology in which power is transmitted using electromagnetic induction, a technology in which power is transmitted using electromagnetic waves, and a technology in which power is transmitted using a resonance method.

Among them, the resonance method is a non-contact power transmission technology in which paired resonators (for example, paired resonance coils) resonate with each other in an electromagnetic field (near field), and thus, power is transmitted via the electromagnetic field. The resonance method makes it possible to transmit great electric power, that is, several kW of electric power over a relatively long distance (for example, several meters).

Japanese Patent Application Publication No. 2009-106136 (JP-A-2009-106136) describes a charging system in which electric power is transmitted to a vehicle from a power source outside the vehicle in a non-contact manner using the resonance method, and a power storage device provided in the vehicle is charged with the electric power.

Electromagnetic noise for other electrical devices may be caused due to the electromagnetic field generated around a coil unit including the resonance coil. For example, noise may be caused in a radio or the like due to the electromagnetic field. Also, when a conductor is disposed in the electromagnetic field, the conductor may be heated due to electromagnetic induction caused by the electromagnetic field, and accordingly, devices may malfunction due to temperature increase.

Therefore, when electric power is transmitted using the resonance method, it is desirable to shield, as much as possible, leakage electromagnetic fields generated in directions other than a direction in which electric power is transmitted and received.

In order to shield the leakage electromagnetic fields, shields may be disposed around a coil case in which the coil unit is housed. In this case, it may be necessary to reduce the size of the shields taking into account a space where the coil case is to be provided in the vehicle.

SUMMARY OF INVENTION

The invention provides a coil unit, a non-contact power transmission device, a non-contact power reception device, a non-contact power supply system, and a vehicle, which reduce leakage electromagnetic fields that occur when electric power is supplied in a non-contact manner using a resonance method.

A first aspect of the invention relates to a coil unit that performs at least one of transmission and reception of electric power using electromagnetic resonance between the coil unit and a primary resonance coil disposed to face the coil unit. The coil unit includes a secondary resonance coil that includes a plurality of coils, and that electromagnetically resonates with the primary resonance coil. A first coil among the plurality of coils is disposed in a manner such that a magnetic field generated by the first coil has a phase opposite to a phase of a magnetic field generated by at least one coil other than the first coil among the plurality of coils, with respect to a plane that faces the primary resonance coil.

The first coil may be disposed adjacent to at least one coil other than the first coil among the plurality of coils, on a plane perpendicular to a direction of the magnetic field generated by the first coil.

The first coil may be disposed in a manner such that the magnetic field generated by the first coil has the phase opposite to the phase of the magnetic field generated by the at least one coil other than the first coil among the plurality of coils, which is adjacent to the first coil.

The number of the plurality of coils may be an even number. The number of the plurality of coils may be two.

The plurality of coils may further include a second coil. The first coil and the second coil may be disposed in a manner such that a direction of winding of the first coil is opposite to a direction of winding of the second coil when the first coil and the second coil are seen from the primary resonance coil. The first coil may be connected to the second coil so that a direction of an electric current flowing through the first coil is opposite to a direction of an electric current flowing through the second coil, when the first coil and the second coil are seen from the primary resonance coil.

The plurality of coils may further include a second coil. The first coil and the second coil may be disposed in a manner such that a direction of winding of the first coil is the same as a direction of winding of the second coil when the first coil and the second coil are seen from the primary resonance coil. The first coil may be connected to the second coil so that a direction of an electric current flowing through the first coil is opposite to a direction of an electric current flowing through the second coil, when the first coil and the second coil are seen from the primary resonance coil.

The plurality of coils may have the substantially same reactance. The plurality of coils may be connected in series to each other.

The plurality of coils may be connected in parallel to each other. The coil unit may further include a capacitor connected to both ends of the secondary resonance coil.

The coil unit may further include an electromagnetic induction coil configured to perform at least one of transmission of electric power to the secondary resonance coil and reception of electric power from the secondary resonance coil, using electromagnetic induction. The electromagnetic induction coil may be magnetically coupled with at least one of the plurality of coils.

The plurality of coils may be separate coils that are not connected to each other. The coil unit may further include an electromagnetic induction coil configured to perform at least one of transmission of electric power to the secondary resonance coil and reception of electric power from the secondary resonance coil, using electromagnetic induction. The electromagnetic induction coil may be magnetically coupled with at least one of the plurality of coils.

The electromagnetic induction coil may be disposed in a manner such that the electromagnetic induction coil is magnetically coupled with a magnetic field generated in the same direction as a direction of axes around which the plurality of coils are wound.

The electromagnetic induction coil may be disposed in a manner such that the electromagnetic induction coil is magnetically coupled with a magnetic field generated in a direction orthogonal to a direction of axes around which the plurality of coils are wound.

The coil unit may further include a plurality of electromagnetic induction coils corresponding to the respective plurality of coils. The plurality of electromagnetic induction coils may be configured to perform at least one of transmission of electric power to the corresponding coils and reception of electric power from the corresponding coils, using electromagnetic induction.

The plurality of electromagnetic induction coils may be connected in series to each other. The plurality of electromagnetic induction coils may be connected in parallel to each other.

The coil unit may further include capacitors corresponding to the respective plurality of coils. Each of the capacitors may be connected to both ends of a corresponding one of the plurality of coils.

A second aspect of the invention relates to a non-contact power reception device that receives electric power from a power transmission device in a non-contact manner. The power transmission device faces the non-contact power reception device. The non-contact power reception device includes a resonance coil that includes a plurality of coils, and that is configured to receive electric power from the power transmission device using electromagnetic resonance between the resonance coil and the power transmission device. A first coil among the plurality of coils is disposed in a manner such that a magnetic field generated by the first coil has a phase opposite to a phase of a magnetic field generated by at least one coil other than the first coil among the plurality of coils, with respect to a plane that faces the power transmission device.

A third aspect of the invention relates to a non-contact power transmission device that transmits electric power to a power reception device in a non-contact manner. The power reception device faces the non-contact power transmission device. The non-contact power transmission device includes a resonance coil that includes a plurality of coils, and that is configured to supply electric power, which has been supplied from a power source device, to the power reception device using electromagnetic resonance between the resonance coil and the power reception device. A first coil among the plurality of coils is disposed in a manner such that a magnetic field generated by the first coil has a phase opposite to a phase of a magnetic field generated by at least one coil other than the first coil among the plurality of coils, with respect to a plane that faces the power reception device.

A fourth aspect of the invention relates to a non-contact power supply system for non-contact transmission of electric power. The non-contact power supply system includes a power transmission device; and a power reception device that faces the power transmission device, and that receives electric power from the power transmission device. The power transmission device includes a resonance coil that includes a plurality of coils, and that is configured to supply electric power, which has been supplied from a power source device, to the power reception device using electromagnetic resonance between the resonance coil and the power reception device. A first coil among the plurality of coils is disposed in a manner such that a magnetic field generated by the first coil has a phase opposite to a phase of a magnetic field generated by at least one coil other than the first coil among the plurality of coils, with respect to a plane that faces the power reception device.

A fifth aspect of the invention relates to a non-contact power supply system for non-contact transmission of electric power. The non-contact power supply system includes a power transmission device that transmits electric power that has been supplied from a power source device; and a power reception device that faces the power transmission device. The power reception device includes a resonance coil that includes a plurality of coils, and that is configured to receive electric power from the power transmission device using electromagnetic resonance between the resonance coil and the power transmission device. A first coil among the plurality of coils is disposed in a manner such that a magnetic field generated by the first coil has a phase opposite to a phase of a magnetic field generated by at least one coil other than the first coil among the plurality of coils, with respect to a plane that faces the power transmission device.

A sixth aspect of the invention relates to a non-contact power supply system for non-contact transmission of electric power. The non-contact power supply system includes a power transmission device; and a power reception device that faces the power transmission device. The power transmission device includes a primary resonance coil that includes a plurality of power transmission coils, and that is configured to supply electric power, which has been supplied from a power source device, to the power reception device using electromagnetic resonance between the primary resonance coil and the power reception device. A first transmission coil among the plurality of power transmission coils is disposed in a manner such that a magnetic field generated by the first transmission coil has a phase opposite to a phase of a magnetic field generated by at least one coil other than the first transmission coil among the plurality of power transmission coils, with respect to a plane that faces the power reception device. The power reception device includes a secondary resonance coil that includes a plurality of power reception coils, and that is configured to receive electric power from the power transmission device using electromagnetic resonance between the secondary resonance coil and the primary resonance coil. A first reception coil among the plurality of power reception coils is disposed in a manner such that a magnetic field generated by the first reception coil has a phase opposite to a phase of a magnetic field generated by at least one coil other than the first reception coil among the plurality of power reception coils, with respect to a plane that faces the power transmission device.

The plurality of power transmission coils and the plurality of power reception coils may be disposed in a manner such that a magnetic field generated by each of the power transmission coils has the same phase as a phase of a magnetic field generated by a corresponding one of the power reception coils, which faces the power transmission coil.

The plurality of power transmission coils and the plurality of power reception coils have the substantially same shape.

A seventh aspect of the invention relates to a non-contact power supply system in which electric power is transmitted and received in a non-contact manner. The non-contact power supply system includes a first transmission device; and a second transmission device that faces the first transmission device. The first transmission device includes a primary resonance coil that includes a plurality of first power transmission reception coils, and that is configured to receive electric power from the second transmission device and to transmit electric power from the first transmission device using electromagnetic resonance between the primary resonance coil and the second transmission device. A first coil among the plurality of first power transmission reception coils is disposed in a manner such that a magnetic field generated by the first coil has a phase opposite to a phase of a magnetic field generated by at least one coil other than the first coil among the plurality of first power transmission reception coils, with respect to a plane that faces the second transmission device. The second transmission device includes a secondary resonance coil that includes a plurality of second power transmission reception coils, and that is configured to receive electric power from the first transmission device and to transmit electric power from the second transmission device using electromagnetic resonance between the secondary resonance coil and the first transmission device. A second coil among the plurality of second power transmission reception coils is disposed in a manner such that a magnetic field generated by the second coil has a phase opposite to a phase of a magnetic field generated by at least one coil other than the second coil among the plurality of second power transmission reception coils, with respect to a plane that faces the first transmission device.

An eighth aspect of the invention relates to a vehicle that receives electric power in a non-contact manner from a power transmission device which is outside the vehicle, and which faces the vehicle. The vehicle includes a power reception device; a power storage device that is charged with electric power received by the power reception device; and a drive device configured to generate drive power for driving the vehicle, using the electric power supplied from the power storage device. The power reception device includes a resonance coil that includes a plurality of coils, and that is configured to receive electric power from the power transmission device using electromagnetic resonance between the resonance coil and the power transmission device. A first coil among the plurality of coils is disposed in a manner such that a magnetic field generated by the first coil has a phase opposite to a phase of a magnetic field generated by at least one coil other than the first coil among the plurality of coils, with respect to a plane that faces the power transmission device.

According to the above-described aspects of the invention, it is possible to provide the coil unit, the non-contact power transmission device, the non-contact power reception device, the non-contact power supply system, and the vehicle, which reduce leakage electromagnetic fields that occur when electric power is supplied in the non-contact manner using the resonance method.

BRIEF DESCRIPTION OF DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
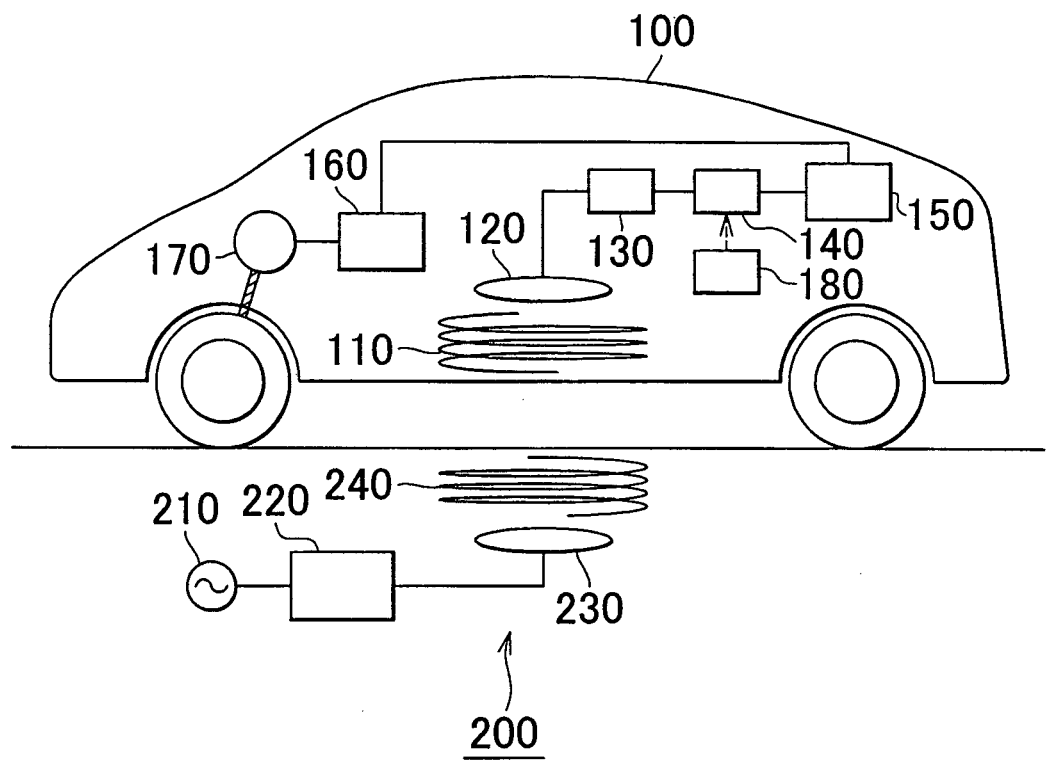
FIG. 1 is a diagram showing the entire configuration of a non-contact power supply system.

Hereinafter, an embodiment of the invention will be described in detail with reference to the drawings. The same and corresponding portions in the drawings will be denoted by the same reference numerals, and the description thereof will not be repeated.

FIG. 1 is a diagram showing the entire configuration of a basic non-contact power supply system. As shown in FIG. 1, the non-contact power supply system includes a vehicle 100 and a power supply device 200.

The vehicle 100 includes a secondary resonance coil 110, a secondary electromagnetic induction coil 120, a rectifier 130, a DC-DC converter 140, a power storage device 150, a Power Control Unit (hereinafter, referred to as "PCU") 160, a motor 170, and a vehicle Electronic Control Unit (ECU) 180.

The configuration of the vehicle 100 is not limited to the configuration shown in FIG. 1, as long as the vehicle 100 is a vehicle driven by a motor. Examples of the vehicle 100 include a hybrid vehicle including a motor and an internal combustion engine, a fuel cell vehicle including a fuel cell, and an electric vehicle.

The secondary resonance coil 110 is provided, for example, at a lower portion of a vehicle body. The secondary resonance coil 110 is an LC resonator whose both ends are not connected to anything. When the secondary resonance coil 110 resonates with a primary resonance coil 240 of the power supply device 200 via an electromagnetic field, the secondary resonance coil 110 receives electric power from the power supply device 200. The capacitance component of the secondary resonance coil 110 is the parasitic capacitance of the coil. A capacitor (not shown) may be additionally connected to the both ends of the secondary resonance coil 110 in order to obtain a predetermined electrostatic capacitance.

The number of turns of the secondary resonance coil 110 is appropriately set so that, for example, a Q value indicating resonance strength between the primary resonance coil 240 of the power supply device 200 and the secondary resonance coil 110 becomes large (for example, the Q value becomes larger than 100) and κ indicating the degree of coupling between the primary resonance coil 240 and the secondary resonance coil 110 becomes large, based on, for example, a distance between the primary resonance coil 240 and the secondary resonance coil 110, and the resonance frequency of the primary resonance coil 240 and the secondary resonance coil 110.

The secondary electromagnetic induction coil 120 is installed coaxially with the secondary resonance coil 110. The secondary electromagnetic induction coil 120 is magnetically coupled with the secondary resonance coil 110 by electromagnetic induction. The secondary electromagnetic induction coil 120 takes out electric power received by the secondary resonance coil 110 using the electromagnetic induction, and outputs the electric power to the rectifier 130.

The rectifier 130 rectifies the alternating-current power (AC power) taken out by the secondary electromagnetic induction coil 120, and outputs direct-current power (DC power) to the DC-DC converter 140. The DC-DC converter 140 converts the voltage level of the electric power rectified by the rectifier 130 to the voltage level of the power storage device 150, and outputs the electric power, whose voltage level has been converted, to the power storage device 150. When electric power is received from the power supply device 200 while the vehicle 100 is traveling, the DC-DC converter 140 may convert the voltage level of the electric power rectified by the rectifier 130 to a system voltage level, and may directly supply the electric power, whose voltage level has been converted, to the PCU 160. The DC-DC converter 140 does not necessarily need to be provided. After the AC power taken out by the secondary electromagnetic induction coil 120 is rectified by the rectifier 130, the DC power may be directly provided to the power storage device 150.

The power storage device 150 is a DC power source that is rechargeable. The power storage device 150 is configured to include a secondary battery such as a lithium ion secondary battery or a nickel-hydrogen secondary battery. The power storage device 150 stores the electric power supplied from the DC-DC converter 140, and regenerative electric power generated by the motor 170. The power storage device 150 supplies the stored electric power to the PCU 160. A capacitor with a large capacitance may be employed as the power storage device 150. Any device may be employed as the power storage device 150, as long as the device serves as an electric power buffer that temporarily stores the electric power supplied from the power supply device 200 and the regenerative electric power supplied from the motor 170, and supplies the stored electric power to the PCU 160.

The PCU 160 drives the motor 170 using the electric power output from the power storage device 150 or the electric power directly supplied from the DC-DC converter 140. The PCU 160 converts the regenerative electric power (AC power) generated by the motor 170 to DC power, and outputs the DC power to the power storage device 150 to charge the power storage device 150. The motor 170 is driven by the PCU 160, and thus, the motor 170 generates drive power for driving the vehicle 100, and outputs the drive power to drive wheels. The motor 170 generates electric power using kinetic energy received from the drive wheels (and received from an engine (not shown) when the vehicle 100 is a hybrid vehicle). The motor 170 outputs the generated regenerative electric power to the PCU 160.

The vehicle ECU 180 includes a Central Processing Unit (CPU), a memory device, and an input/output buffer, although none of them are shown in FIG. 1. The vehicle ECU 180 receives signals from sensors and the like, and outputs control signals to devices. In addition, the vehicle ECU 180 performs controls over the vehicle 100 and the devices. The controls are not limited to controls performed by software, and the controls may be performed by hardware (an electronic circuit) for exclusive use. In FIG. 1, the vehicle ECU 180 is configured to control the travel of the vehicle 100 and the reception of electric power from the power supply device 200. However, the configuration of the control device in the embodiment of the invention is not limited to this configuration. That is, the vehicle 100 may include control devices provided separately for respective devices or respective functions. For example, the vehicle 100 may include a power reception ECU that mainly controls the reception of electric power.

The vehicle ECU 180 controls the DC-DC converter 140 when electric power is supplied from the power supply device 200 to the vehicle 100. For example, the vehicle ECU 180 controls a voltage, which has been input from the rectifier 130 to the DC-DC converter 140, to a predetermined target voltage, by controlling the DC-DC converter 140. Also, when the vehicle 100 is traveling, the vehicle ECU 180 controls the PCU 160 based on the traveling state of the vehicle and the State of Charge (SOC) of the power storage device 150.

The power supply device 200 includes an AC power source 210, a high-frequency power driver 220, a primary electromagnetic induction coil 230, and the primary resonance coil 240.

The AC power source 210 is a power source outside the vehicle. For example, the AC power source 210 is a commercial power source. The high-frequency power driver 220 converts electric power received from the AC power source 210 to high-frequency electric power, and supplies the high-frequency electric power to the primary electromagnetic induction coil 230. The frequency of the high-frequency electric power generated by the high-frequency power driver 220 is, for example, 1 MHz to several tens of MHz.

The primary electromagnetic induction coil 230 is installed coaxially with the primary resonance coil 240. The primary electromagnetic induction coil 230 is magnetically coupled with the primary resonance coil 240 by electromagnetic induction. The primary electromagnetic induction coil 230 supplies the high-frequency electric power, which has been supplied from the high-frequency power driver 220, to the primary resonance coil 240.

The primary resonance coil 240 is installed, for example, at a position near a ground surface. The primary resonance coil 240 is an LC resonator whose both ends are not connected to anything, as well as the secondary resonance coil 110. When the primary resonance coil 240 resonates with the secondary resonance coil 110 of the vehicle 100 via the electromagnetic field, the primary resonance coil 240 transmits electric power to the vehicle 100. The capacitance component of the primary resonance coil 240 is the parasitic capacitance of the coil. As in the case of the secondary resonance coil 110A, a capacitor (not shown) may be additionally connected to both ends of the primary resonance coil 240.

The number of turns of the primary resonance coil 240 is appropriately set so that, for example, the Q value becomes large (for example, the Q value becomes larger than 100) and the coupling degree κ becomes large, based on, for example, the distance between the primary resonance coil 240 and the secondary resonance coil 110 of the vehicle 100, and the resonance frequency of the primary resonance coil 240 and the secondary resonance coil 110.

Figure 2:
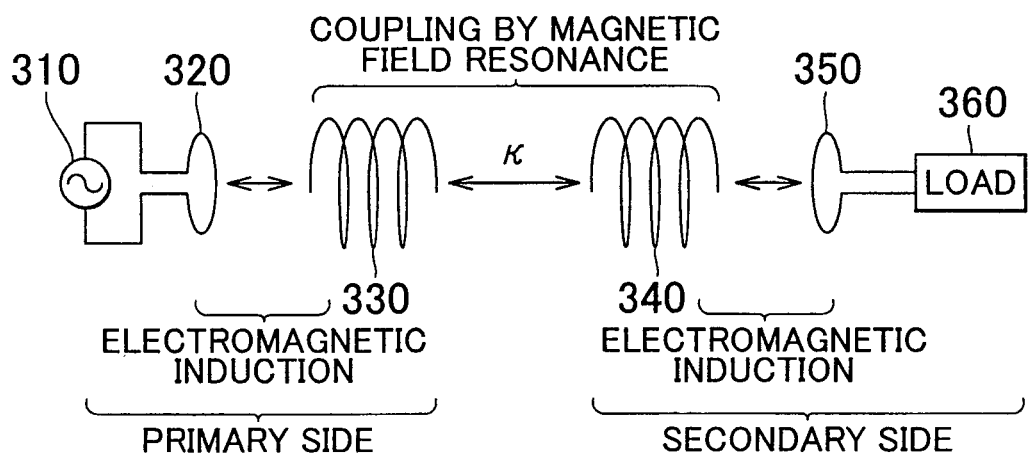
FIG. 2 is a diagram used to explain the principle of power transmission using a resonance method.

FIG. 2 is a diagram used to explain the principle of electric power transmission using a resonance method. As shown in FIG. 2, in the resonance method, when two LC resonators having the same eigen frequency resonate with each other in an electromagnetic field (near field) in the same manner as the manner in which two tuning forks resonate with each other, electric power is transmitted from one coil to the other coil via the electromagnetic field.

More specifically, a primary electromagnetic induction coil 320 is connected to a high-frequency power source 310, and high-frequency electric power at 1 MHz to several tens of MHz is supplied to a primary resonance coil 330 that is magnetically coupled with the primary electromagnetic induction coil 320 by electromagnetic induction. The primary resonance coil 330 is an LC resonator that resonates due to the inductance and the parasitic capacitance of the coil itself (and the capacitance of a capacitor when the capacitor is connected to the coil). The primary resonance coil 330 resonates with a secondary resonance coil 340 that has the same resonance frequency as that of the primary resonance coil 330, via an electromagnetic field (near field). As a result, energy (electric power) is transferred from the primary resonance coil 330 to the secondary resonance coil 340 via the electromagnetic field. The energy (electric power) that has been transferred to the secondary resonance coil 340 is taken out by a secondary electromagnetic induction coil 350 that is magnetically coupled with the secondary resonance coil 340 by electromagnetic induction, and the energy (electric power) is supplied to a load 360. In the resonance method, electric power is transmitted when the Q value indicating the resonance strength between the primary resonance coil 330 and the secondary resonance coil 340 is larger than 100.

The corresponding relation between FIG. 1 and FIG. 2 will be described. The AC power source 210 and the high-frequency power driver 220 correspond to the high-frequency power source 310 in FIG. 2. The primary electromagnetic induction coil 230 and the primary resonance coil 240 in FIG. 1 correspond to the primary electromagnetic induction coil 320 and the primary resonance coil 330 in FIG. 2, respectively. The secondary resonance coil 110 and the secondary electromagnetic induction coil 120 in FIG. 1 correspond to the secondary resonance coil 340 and the secondary electromagnetic induction coil 350 in FIG. 2, respectively. The rectifier 130 to the motor 170 in FIG. 1 collectively correspond to the load 360 in FIG. 2.

Figure 3:
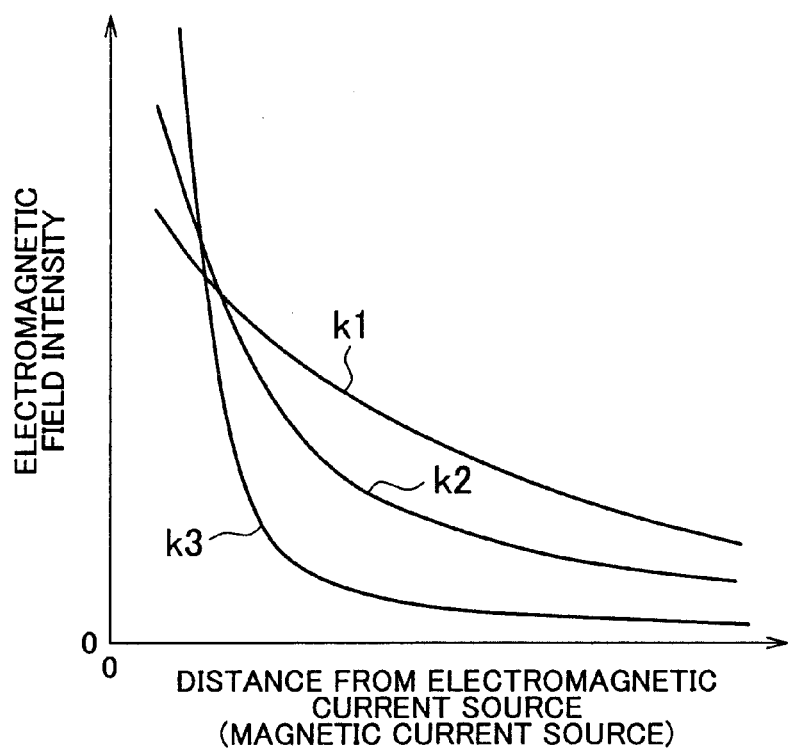
FIG. 3 is a diagram showing a relation between a distance from an electric current source (magnetic current source) and electromagnetic field intensity.

FIG. 3 is a diagram showing a relation between a distance from an electric current source (magnetic current source) and electromagnetic field intensity. As shown in FIG. 3, the electromagnetic field is composed of three components. A curve k1 indicates the component that is inversely proportional to the distance from the wave source, and is referred to as "a radiation magnetic field". A curve k2 indicates the component that is inversely proportional to the square of the distance from the wave source, and is referred to as "an induction electromagnetic field". A curve k3 indicates the component that is inversely proportional to the cube of the distance from the wave source, and is referred to as "a static electromagnetic field".

"The static electromagnetic field" is a region where the electromagnetic field intensity sharply decreases as the distance from the wave source increases. In the resonance method, energy (electric power) is transmitted using a near field (an evanescent field) where "the static electromagnetic field" is dominant. That is, paired resonators (for example, paired LC resonators) having the same eigen frequency resonate with each other in the near field where "the static electromagnetic field" is dominant. Thus, energy (electric power) is transmitted from one of the resonators (the primary resonance coil) to the other resonator (the secondary resonance coil). "The static electromagnetic field" does not transmit energy to a far area. Therefore, in the resonance method, energy is transmitted with less energy loss, as compared to when using an electromagnetic field where energy (electric power) is transmitted by "the radiation electromagnetic field" that transmits energy to a far area.

Figure 4:
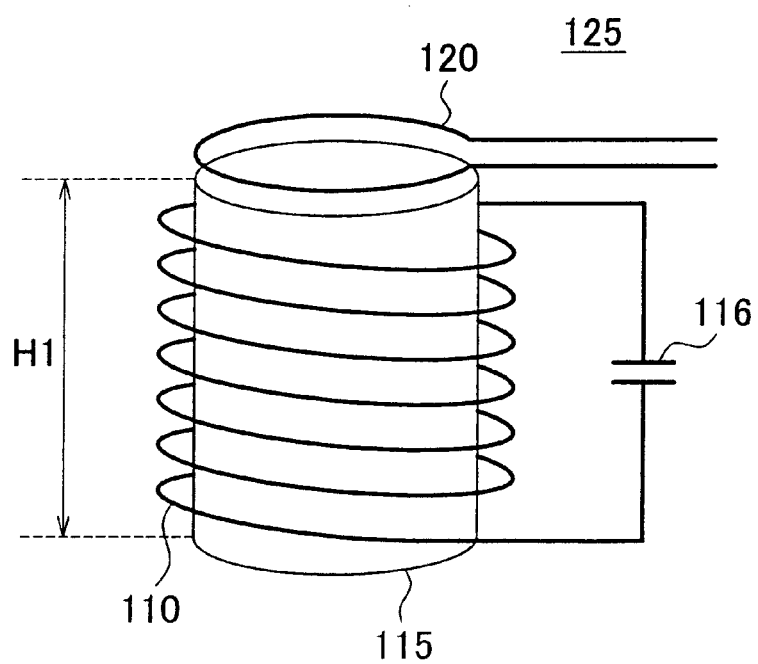
FIG. 4 is a schematic diagram showing a coil unit in a vehicle shown in FIG. 1.

FIG. 4 is a schematic diagram showing a coil unit in the vehicle 100 in FIG. 1. A coil unit in the power supply device 200 has the same configuration as the configuration of the coil unit in the vehicle 100, and therefore, the description thereof will not be repeated.

As shown in FIG. 4, a coil unit 125 includes a bobbin 115, a capacitor 116, and the secondary resonance coil 110 and the secondary electromagnetic induction coil 120 that are shown in FIG. 1.

The coil material of the secondary resonance coil 110 is wound around the bobbin 115. The both ends of the secondary resonance coil 110 are connected to the capacitor 116, and thus, the LC resonator is configured. The capacitor 116 may be provided in the inside of the bobbin 115 in order to reduce the size of the coil unit 125. The capacitor 116 does not necessarily need to be provided. When a desired capacitance component is obtained using the parasitic capacitance of the secondary resonance coil 110, the both ends of the secondary resonance coil 110 are not connected to anything.

The coil material of the secondary electromagnetic induction coil 120 is wound around the bobbin 115 that is cylindrical and has an insulation property. The secondary electromagnetic induction coil 120 is disposed coaxially with the secondary resonance coil 110. Both ends of the secondary electromagnetic induction coil 120 are formed in, for example, a box shape, and are disposed outside a coil case (not shown) in which the coil unit 125 is housed. Thus, both ends of the secondary electromagnetic induction coil 120 are connected to a load. The secondary electromagnetic induction coil 120 takes out electric power received by the secondary resonance coil 110, using electromagnetic induction.

When the secondary resonance coil 110 electromagnetically resonates with the primary resonance coil 240 of the power supply device 200 (refer to FIG. 1), which faces the secondary resonance coil 110, the secondary resonance coil 110 receives electric power from the supply device 200. Electric power is transmitted between the secondary resonance coil 110 and the secondary electromagnetic induction coil 120 by electromagnetic induction.

In electric power transmission using the resonance method, energy (electric power) is transmitted via the electromagnetic field as described above. Therefore, when electric power is supplied, the electromagnetic field is formed around the coil unit.

Electromagnetic noise for other electrical devices may be caused due to the electromagnetic field generated around the coil unit. For example, noise may be caused in a radio or the like due to the electromagnetic field. Also, when a conductor is disposed in the electromagnetic field, the conductor may be heated due to electromagnetic induction caused by the electromagnetic field. In this case, devices may malfunction due to temperature increase caused by the electromagnetic induction.

Particularly, in the case where electric power is supplied to the vehicle as shown in FIG. 1, the power supply device is usually installed outdoors, and therefore, the above-described influence on a surrounding area may become problematic. Further, because great electric power is transmitted, a large electric current flows through the coil, and accordingly, the intensity of the generated electromagnetic field is high.

Thus, it is desirable to shield, as much as possible, so-called leakage electromagnetic fields that occur in directions other than the direction in which electric power is transmitted and received between the power supply device 200 and the vehicle 100, in order to reduce the above-described influence. In order to achieve this purpose, shields produced using an electromagnetic shielding material may be installed on surfaces of the coil case (not shown) in which the coil unit is housed, except a surface that faces in the direction in which electric power is transmitted and received.

However, in the case where the coil unit is provided in the vehicle, the coil unit is disposed, for example, at the lower portion of the vehicle body as shown in FIG. 1, and when the leakage electromagnetic fields are to be completely shielded by the shields, the size of the coil case is increased by installing the shields. Accordingly, in a small-sized vehicle such as a compact car, it may be difficult to secure an installation site where the coil unit is to be installed.

Accordingly, in the coil unit in the embodiment, the resonance coil, which occupies a large portion of the coil unit, is constituted by a plurality of coils that are connected in series to each other. In addition, the plurality of coils are disposed adjacent to each other on a plane that is parallel to the surface through which electric power is transmitted and received. Further, the coils are oriented so that the electromagnetic fields, which are generated by the coils adjacent to each other, have phases opposite to each other. The resonance coil may be constituted by a plurality of coils that are connected in parallel to each other.

By configuring the coil unit in the above-described manner, the size of each coil (more specifically, the length of each coil in the direction of a central axis around which the coil is wound) is decreased, and accordingly, the height of the entire coil unit is decreased. That is, the coil unit whit a decreased thickness is provided. Further, it is possible to reduce at least a portion of the electromagnetic fields that leak to the surrounding area, by disposing the coils in a manner such that the electromagnetic fields, which are generated by the coils adjacent to each other, have phases opposite to each other. As a result, it is possible to reduce the electromagnetic fields generated in the surrounding area when electric power is transmitted. Thus, it is expected to reduce restrictions on the site where the coil unit is to be installed.

Figure 5:
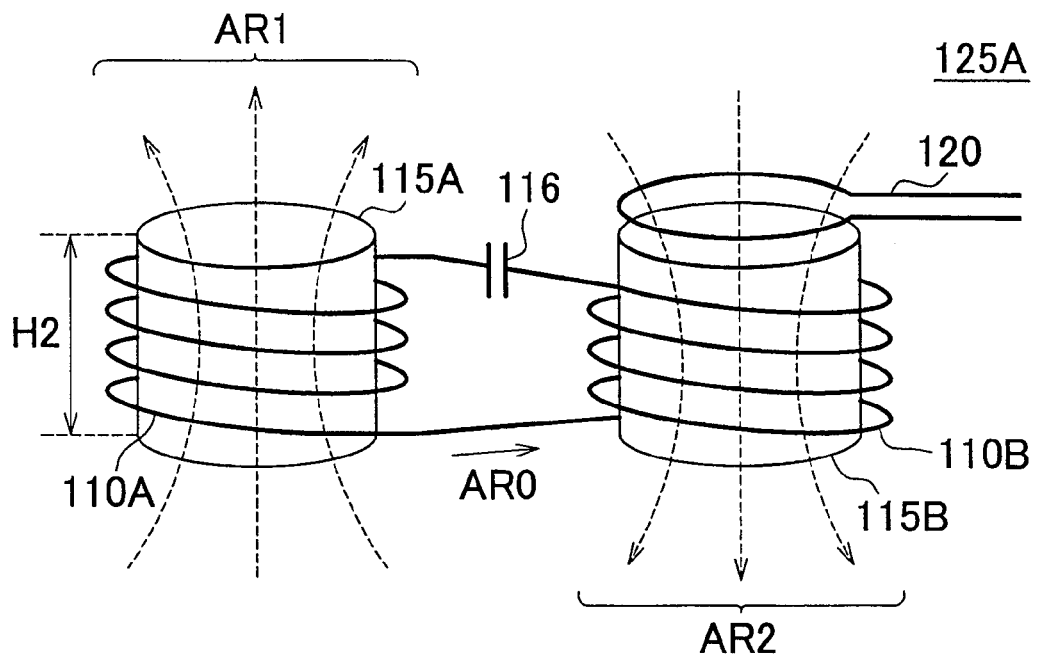
FIG. 5 is a schematic diagram showing a first example of a coil unit according to an embodiment of the invention.

FIG. 5 is a schematic diagram showing a coil unit according to the embodiment of the invention. FIG. 5 shows an example of the coil unit in the vehicle, as well as FIG. 4, and shows the case where the resonance coil is constituted by two coils. The configuration of the coil unit in the power supply device may be the same as the configuration of the coil unit in the vehicle.

As shown in FIG. 5, a coil unit 125A includes secondary resonance coils 110A and 110B, bobbins 115A and 115B, the capacitor 116, and the secondary electromagnetic induction coil 120.

The secondary resonance coils 110A and 110B are wound around the bobbins 115A and 115B, respectively. One end of the secondary resonance coil 110A and one end of the secondary resonance coil 110B are connected to each other. The other end of the secondary resonance coil 110A and the other end of the secondary resonance coil 110B are connected to respective terminals of the capacitor 116. Because one end of the secondary resonance coil 110A and one end of the secondary resonance coil 110B are connected to each other, the other end of the secondary resonance coil 110A and the other end of the secondary resonance coil 110B can be regarded as both ends of the secondary resonance coils 110A and 110B. Thus, the capacitor 116 is connected to both ends of the secondary resonance coils 110A and 110B. The capacitor 116 may be provided in the inside of one of the bobbins 115A and 115B.

The secondary resonance coils 110A and 110B are disposed adjacent to each other on a plane perpendicular to the direction of the central axes around which the secondary resonance coils 110A and 110B are wound. That is, the secondary resonance coils 110A and 110B are disposed adjacent to each other on a plane perpendicular to the direction of the magnetic field that is generated by each of the secondary resonance coils 110A and 110B at the central axis. In this case, the directions of winding of the secondary resonance coils 110A and 110B, and the manner in which the secondary resonance coils 110A and 110B are connected to each other are set so that the electromagnetic fields, which are generated by the secondary resonance coils 110A and 110B, have phases opposite to each other. More specifically, the secondary resonance coils 110A and 110B are disposed in a manner such that the electromagnetic fields generated by the secondary resonance coils 110A and 110B have phases opposite to each other, with respect to a plane that faces the primary resonance coil.

For example, the secondary resonance coil 110 in FIG. 4 is divided into two coils (that is, the secondary resonance coils 110A and 110B), at a position near the substantially center portion of the secondary resonance coil 110 so that the reactances of the two coils are substantially equal to each other, and the two coils are disposed so that the directions of winding of the two coils are the same when the two coils are seen from the power supply device. The end portions of the secondary resonance coils 110A and 110B, which are closer to the power supply device than the other end portions of the secondary resonance coils 110A and 110B, are connected to each other, and the end portions of the secondary resonance coils 110A and 110B, which are farther from the power supply device than the other end portions of the secondary resonance coils 110A and 110B, are connected to each other through the capacitor 116 so that the direction of the electric current flowing through the secondary resonance coil 110A is opposite to the direction of the electric current flowing through the secondary resonance coil 110B when the secondary resonance coils 110A and 110B are seen from the power supply device. By disposing and connecting the secondary resonance coils 110A and 110B in the above-described manners, the secondary resonance coils 110A and 110B in FIG. 5 are generated.

Next, the case where the electric current flows through the coils, for example, in a direction shown by a solid arrow AR0 in FIG. 5 will be assumed. In this case, in the secondary resonance coil 110A, the electromagnetic field is generated in the direction shown by dashed lines AR1, that is, the electromagnetic field is generated in the direction from a lower position to an upper position in FIG. 5 at the central axis around which the coil is wound. The secondary resonance coil 110B is disposed adjacent to the secondary resonance coil 110A so that in the secondary resonance coil 110B, the electromagnetic field is generated in the direction shown by dashed arrows AR2, that is, the electromagnetic field is generated in the direction from the upper position to the lower position in FIG. 5 at the central axis around which the coil is wound.

The secondary electromagnetic induction coil 120 is disposed concentrically with one of the secondary resonance coils 110A and 110B. FIG. 5 shows the example in which the secondary electromagnetic induction coil 120 is disposed concentrically with the secondary resonance coil 110B.

With this configuration, a height H2 of the coils in FIG. 5 is smaller than a height H1 of the coil in FIG. 4, as long as the coils are the resonance coils having the same resonance frequency. Accordingly, it is possible to provide the coil unit with a decreased thickness.

In the case where the resonance frequency is high, the number of turns of the resonance coil is small, and the thickness of the coil is made small as compared to the diameter of the coil. Therefore, in this case, a large portion of the thickness of the coil unit is constituted by the thickness of a shield case (not shown) for blocking the leakage of the electromagnetic fields to the surrounding area. The shield case is designed to encompass the electromagnetic fields generated by the coil. Therefore, as the diameter of the coil becomes larger, the thickness of the shield case becomes larger. Thus, it is possible to further reduce the thickness of the coil unit, by reducing the winding radius of each coil when the coil is divided as shown in FIG. 5.

Figure 6:
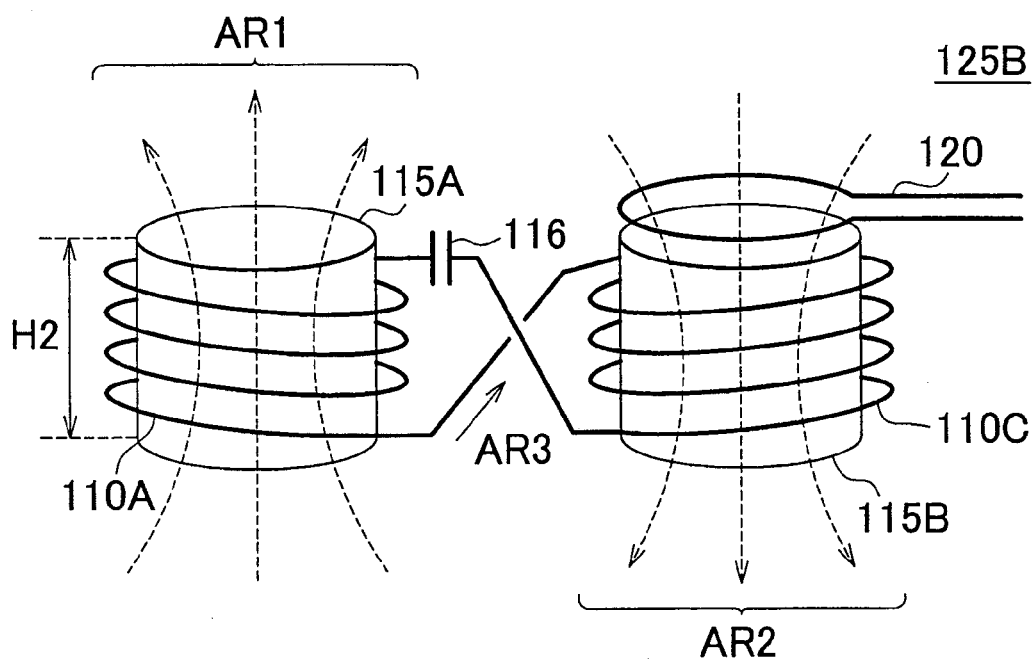
FIG. 6 is a schematic diagram showing a second example of the coil unit according to the embodiment of the invention.

In FIG. 5, the secondary resonance coils 110A and 110B are disposed in a manner such that the directions of winding of the secondary resonance coils 110A and 110B are the same when the secondary resonance coils 110A and 110B are seen from the power supply device. However, the secondary resonance coils may be disposed in a manner such that the directions of winding of the secondary resonance coils are opposite to each other, as in a coil unit 125B in FIG. 6, in which secondary resonance coils 110A and 110C are disposed in a manner such that the directions of winding of the secondary resonance coils 110A and 110C are opposite to each other. In this case, the end portion of the secondary resonance coil 110A, which is closer to the power supply device, is connected to the end portion of the secondary resonance coil 110C, which is farther from the power supply device, and the end portion of the secondary resonance coil 110A, which is farther from the power supply device, is connected to the end portion of the secondary resonance coil 110C, which is closer to the power supply device, through the capacitor 116. By connecting the secondary resonance coils 110A and 110C in the above-described manner, the direction of the electric current flowing through the secondary resonance coil 110A is opposite to the direction of the electric current flowing through the secondary resonance coil 110C, when the secondary resonance coils 110A and 110C are seen from the power supply device. Therefore, the electric magnetic fields, which are generated by the secondary resonance coils 110A and 110C, have phases opposite to each other, as in the case shown in FIG. 5.

Figure 7:
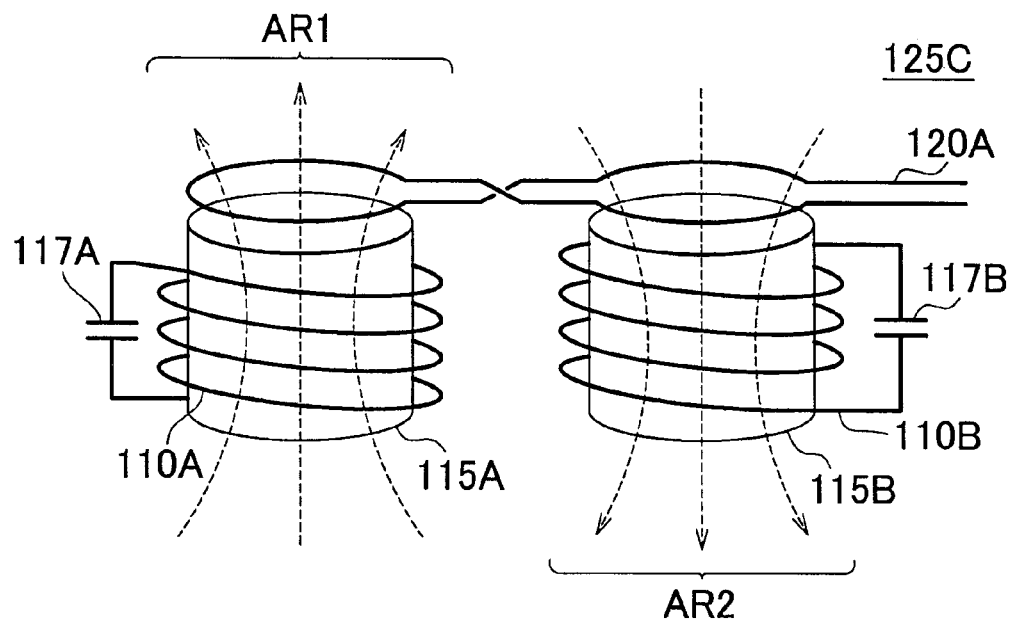
FIG. 7 is a schematic diagram showing a third example of the coil unit according to the embodiment of the invention.
Figure 8:
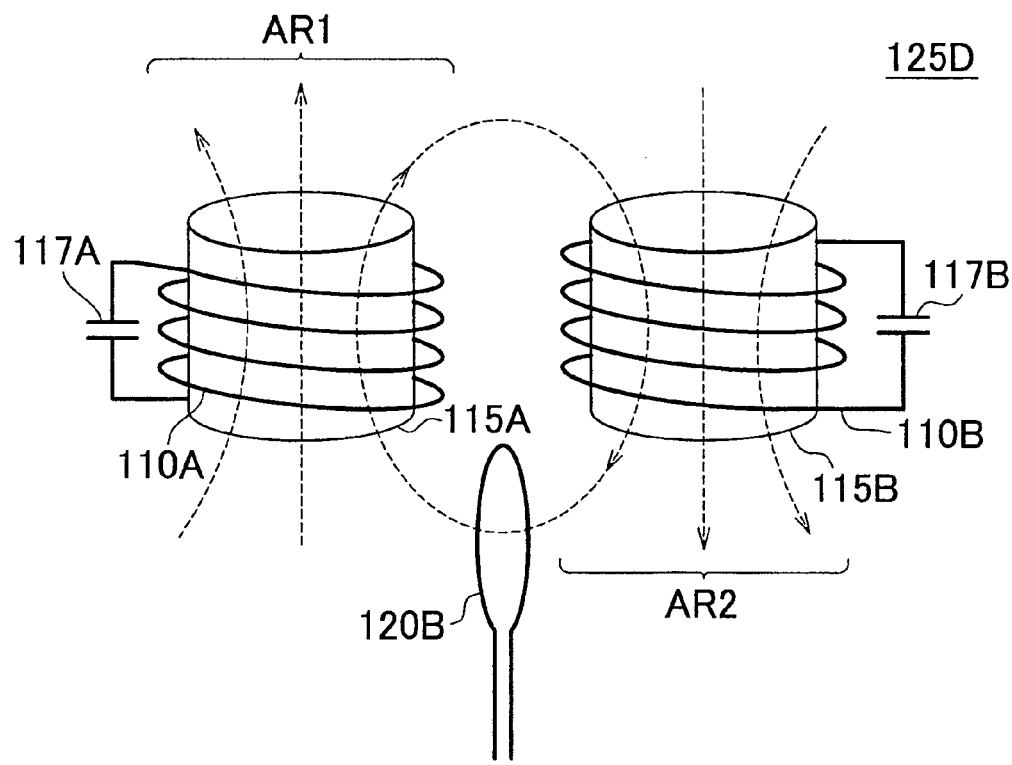
FIG. 8 is a schematic diagram showing a fourth example of the coil unit according to the embodiment of the invention.

The secondary resonance coils 110A and 110B in FIG. 5 may be separate coils that are not connected to each other, as in a coil unit 125C shown in FIG. 7. In this case, in order to adjust the resonance frequency, the secondary resonance coils 110A and 110B are provided with capacitors 117A and 117B, respectively. The secondary electromagnetic induction coil for taking out electric power from the secondary resonance coils 110A and 110B may be disposed in the same manner as the manner in which a secondary electromagnetic induction coil 120A in FIG. 7 is disposed, that is, the secondary electromagnetic induction coil may be disposed in a manner such that the secondary electromagnetic induction coil is coupled with the electromagnetic fields that extend in the same direction as the direction of the axes around which the secondary resonance coils 110A and 110B are wound. Also, the secondary electromagnetic induction coil may be disposed in the same manner as the manner in which a secondary electromagnetic induction coil 120B in a coil unit 125D in FIG. 8 is disposed, that is, the secondary electromagnetic induction coil may be disposed in a manner such that the secondary electromagnetic induction coil is coupled with the electromagnetic field that extends in a direction orthogonal to the axes around which the secondary resonance coils 110A and 110B are wound.

Figure 9:
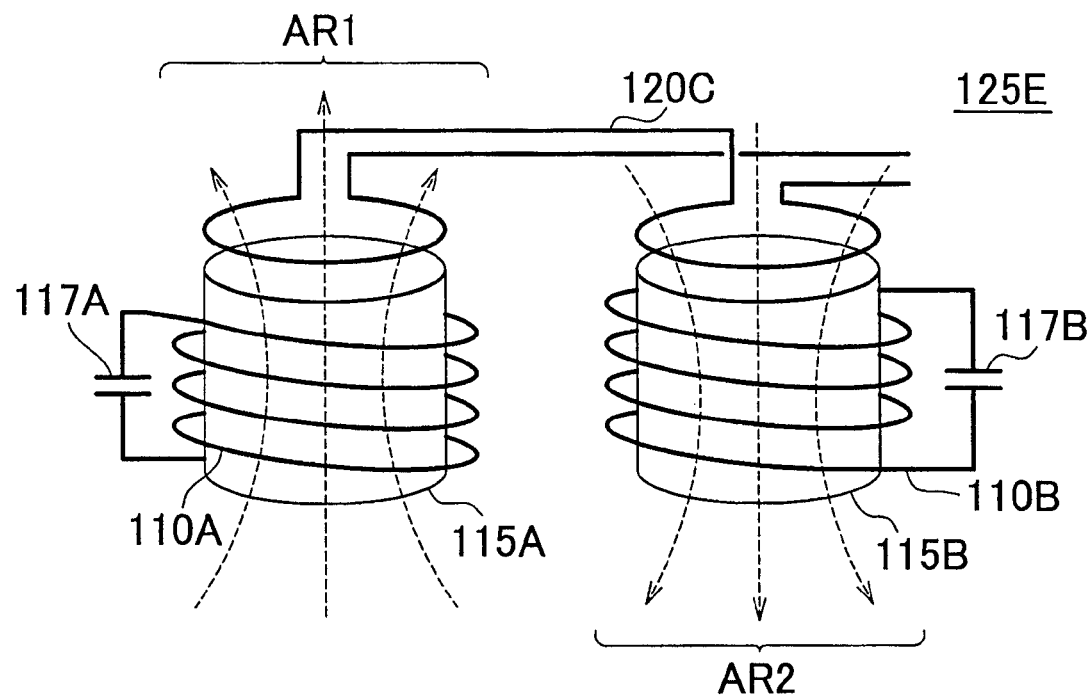
FIG. 9 is a schematic diagram showing a fifth example of the coil unit according to the embodiment of the invention.
Figure 10:
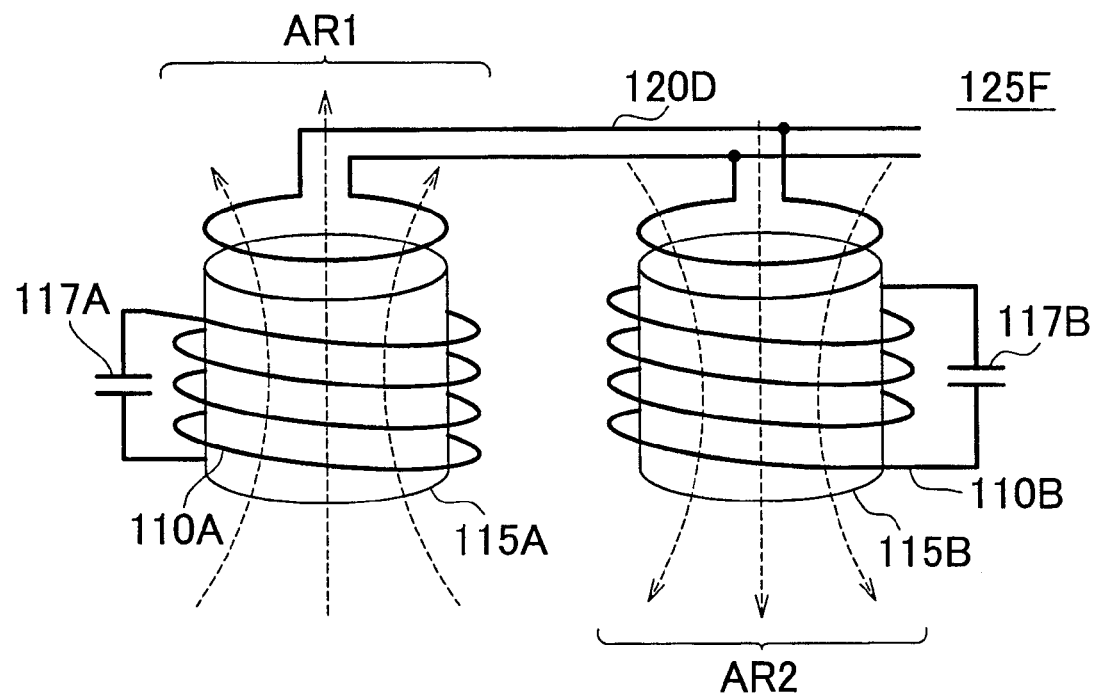
FIG. 10 is a schematic diagram showing a sixth example of the coil unit according to the embodiment of the invention.

Further, a plurality of secondary electromagnetic induction coils corresponding to the secondary resonance coils 110A and 110B may be provided. The plurality of secondary electromagnetic induction coils may be connected in series to each other, as in a coil unit 125E in FIG. 9, in which secondary electromagnetic induction coils 120C are connected in series to each other. Also, the plurality of secondary electromagnetic induction coils may be connected in parallel to each other, as in a coil unit 125F in FIG. 10, in which secondary electromagnetic induction coils 120D are connected in parallel to each other.

Each of FIG. 5 to FIG. 10 shows the example in which the number of turns of each coil is more than one, in order to explain the direction of winding of the coil. However, each coil may be a single-turn coil whose number of turns is one, as long as a desired resonance frequency is obtained.

Next, electromagnetic fields generated around the coil unit with the above-described configuration will be described with reference to FIG. 11 and FIG. 12.

Figure 11:
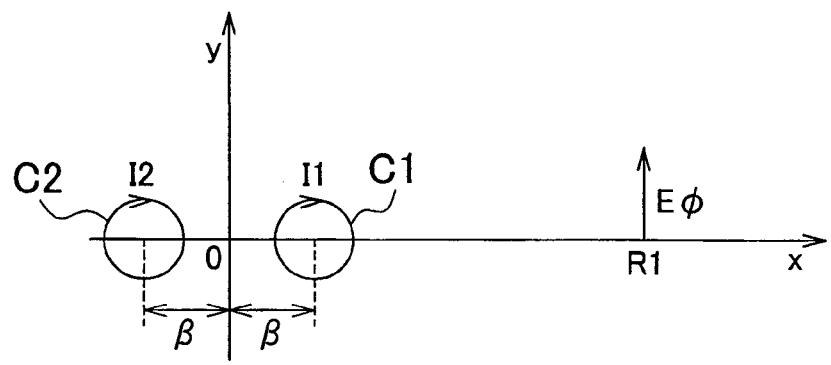
FIG. 11 is a diagram used to explain an example of the size of an electric field related to an electromagnetic field that remains at a point due to electromagnetic fields generated when electric currents flow through two coils.

FIG. 11 is a diagram showing the configuration that serves as a basis when calculating the size of an electric field related to an electromagnetic field that remains at a point due to electromagnetic fields generated by electric currents flowing through two coils.

As shown in FIG. 11, coils C1 and C2 are disposed on an X-Y plane in a manner such that the center of the coil C1 is on an X axis at a distance $\beta$ from an original point in the positive direction of the X axis, and the center of the coil C2 is on the X axis at the distance $\beta$ from the original point in the negative direction of the X axis. The specifications of the coil C1 are the same as those of the coil C2. For example, the number of turns of the coil C1 is the same as that of the coil C2, the diameter of the coil C1 is the same as that of the coil C2, the direction of winding of the coil C1 is the same as that of the coil C2, and the material of the coil C1 is the same as that of the coil C2.

Electric field intensity $E\phi$ at a point R1 on the X axis is calculated when electric currents I1 and I2 flow through the coils C1 and C2, respectively. Arrows in FIG. 11 show the positive directions of the electric currents I1 and I2.

Figure 12:
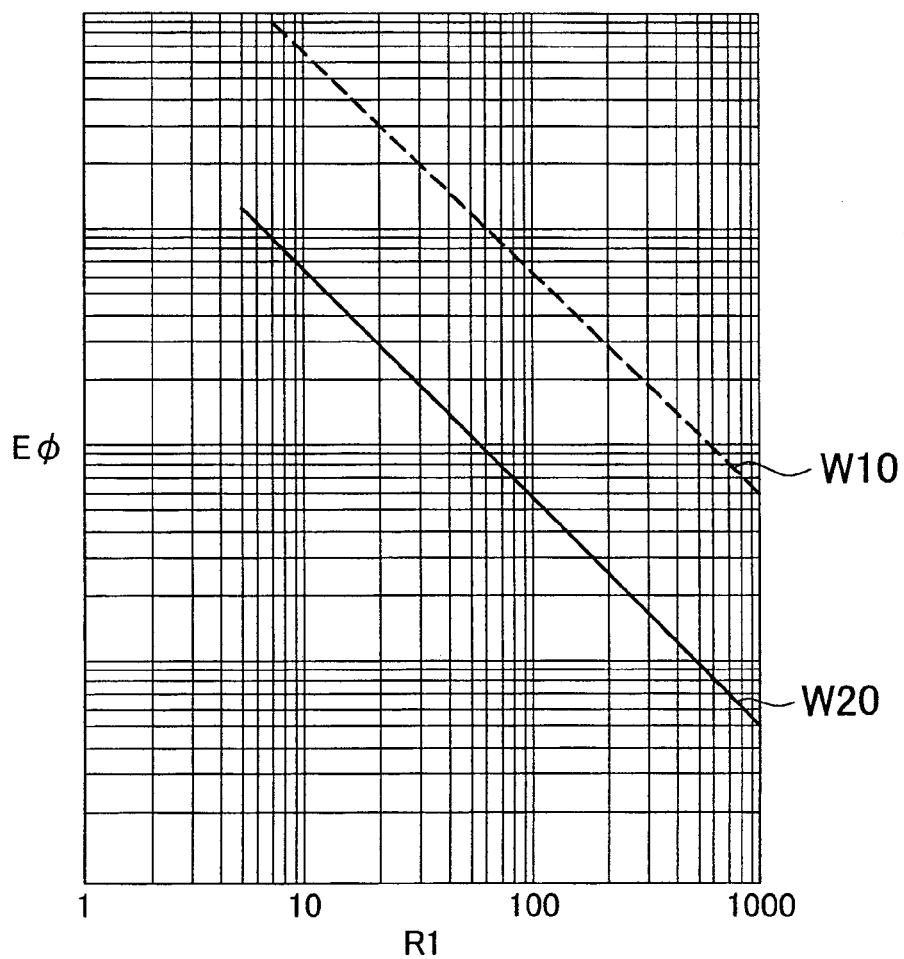
FIG. 12 is a graph showing an example of the size of an electric field generated at each of points in each of the case where electric currents having the same phase flow through two coils, and the case where electric currents having phases opposite to each other flow through the two coils.

FIG. 12 shows an example of calculation results in the case where each of the values of the electric currents I1 and I2 is $+\alpha$ (that is, in the case where the electromagnetic fields with the same phases are generated), and in the case where the value of the electric current I1 is $+\alpha$ and the value of the electric current I2 is $-\alpha$ (that is, in the case where the electromagnetic fields with phases opposite to each other are generated).

In FIG. 12, an abscissa axis indicates a distance between the original point and the measurement point R1 on the X axis, in the form of a logarithm, and an ordinate axis indicates the electric field intensity $E\phi$ at the measurement point R1, in the form of a logarithm. In FIG. 12, a dashed curve W10 indicates the electric field intensity $E\phi$ when the electromagnetic fields with the same phase are generated by the coils C1 and C2. A solid curve W20 indicates the electric field intensity $E\phi$ when the electromagnetic fields with phases opposite to each other are generated by the coils C1 and C2.

It is evident that in an example shown in FIG. 12, the value of the electric field intensity $E\phi$ when the electromagnetic fields with phases opposite to each other are generated is approximately one tenth of the value of the electric field intensity $E\phi$ when the electromagnetic fields with the same phase are generated. Electric power generated due to the electric field intensity is proportional to the square of the electric field intensity. Therefore, the value of the electric power when the electromagnetic fields with phases opposite to each other are generated is approximately one hundredth of the value of the electric power when the electromagnetic fields with the same phase are generated. Particularly, at a sufficiently far point at which the distance $2\beta$ between the coils C1 and C2 is negligible, it can be regarded that the electromagnetic fields with phases opposite to each other are emitted from the substantially same position, and therefore, the electric field intensity $E\phi$ at the point is substantially zero.

In FIG. 11, a distance between each point on the Y axis and the coil C1 is equal to a distance between the point on the Y axis and the coil C2. Therefore, the electric field intensity $E\phi$ at each point on the Y axis due to the electromagnetic fields with phases opposite to each other is constantly zero theoretically. Accordingly, it is possible to particularly reduce the electromagnetic field in a specific direction, by appropriately adjusting the positions of the coils C1 and C2.

Thus, by using the coil unit that includes a plurality of resonance coils that generate the electromagnetic fields with phases opposite to each other, it is possible to reduce the leakage electromagnetic fields around the coil unit. Accordingly, it is possible to reduce the electromagnetic shielding ability required of the shields. This makes it possible to reduce the thickness of the shields, and to reduce the size of the coil case. As a result, it is possible to further reduce the restrictions on the site where the coil unit is to be installed, and to reduce the cost of the coil unit and the cost of the coil case.

Figure 13:
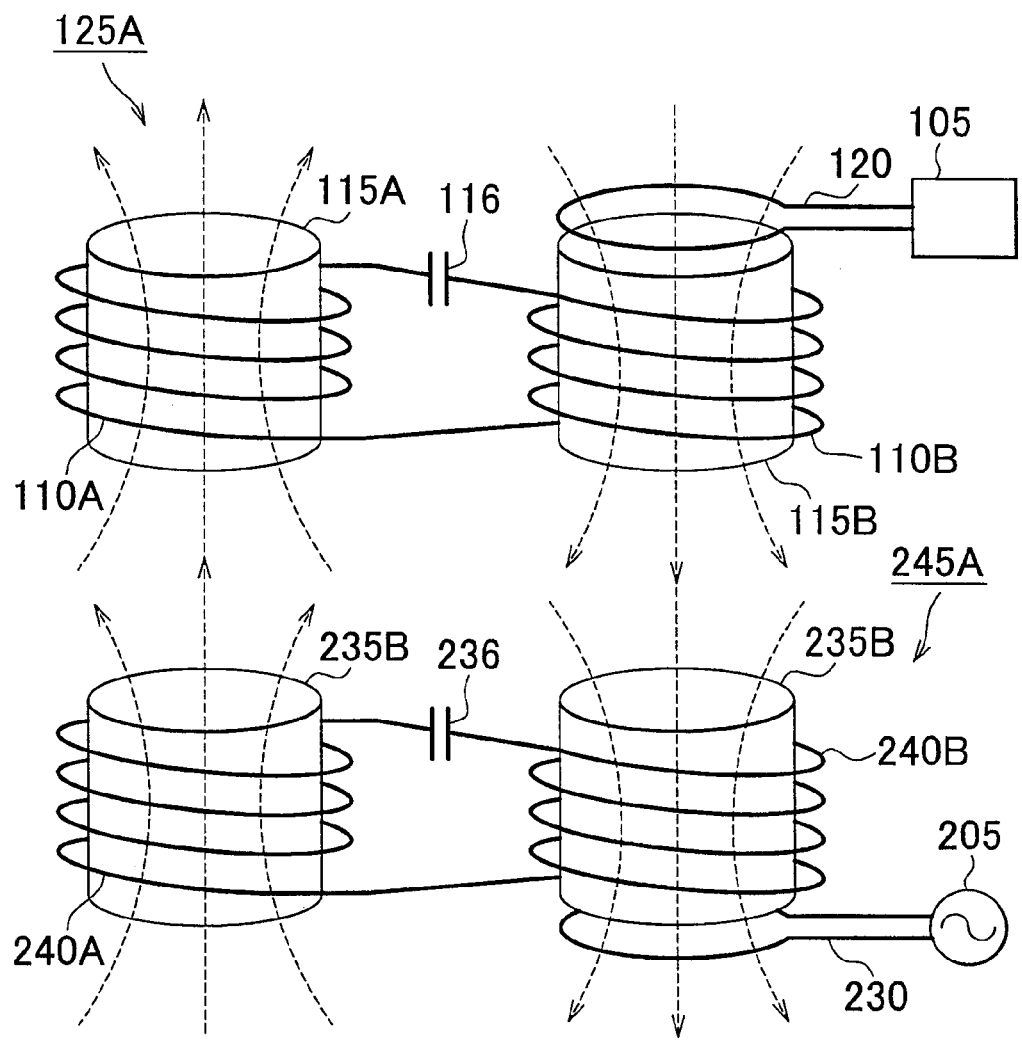
FIG. 13 is a diagram showing an example in which the coil unit according to the embodiment is used in each of a power supply device and a power reception device.

FIG. 13 is a diagram showing an example in which the coil unit shown in FIG. 5 is used in each of the power supply device 200 and the vehicle 100 that functions as a power reception device.

The coil unit 125A in the vehicle 100 is the same as the coil unit 125A shown in FIG. 5. Electric power taken out by the secondary electromagnetic induction coil 120 is output to a load 105 including the rectifier 130 and the power storage device 150.

A coil unit 245A in the power supply device 200 includes the primary electromagnetic induction coil 230, bobbins 235A and 235B, primary resonance coils 240A and 240B, and a capacitor 236. The specifications of these elements, such as the shapes, arrangement, sizes and connection configuration of these elements, may be the same as those of the elements in the coil unit 125A provided in the vehicle 100. In addition, the resonance coils may be installed in a manner such that the primary resonance coil 240A faces the secondary resonance coil 110A, and the primary resonance coil 240B faces the secondary resonance coil 110B.

When electric power is supplied from a high-frequency power source 205 to the primary electromagnetic induction coil 230 in this situation, for example, the electromagnetic fields in directions shown by arrows in FIG. 13 are generated, and electric power is transmitted between the primary resonance coil 240A and the secondary resonance coil 110A, and between the primary resonance coil 240B and the secondary resonance coil 110B. The electromagnetic fields generated by the primary resonance coil 240A and the secondary resonance coil 110A have the same phase, and the electromagnetic fields generated by the primary resonance coil 240B and the secondary resonance coil 110B have the same phase.

Although the case where the two resonance coils are provided in each coil unit have been described, the number of the resonance coils is not limited two.

Figure 14:
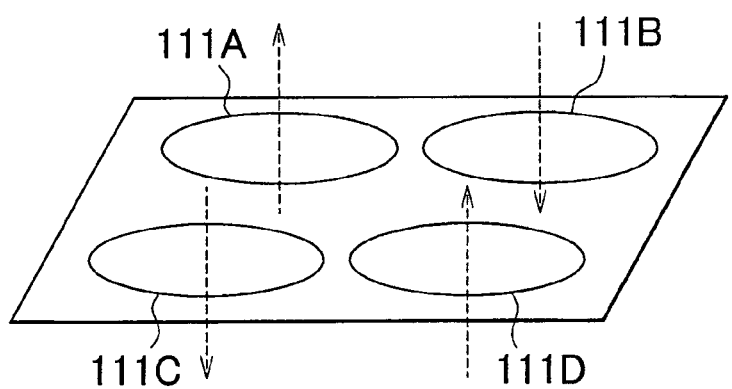
FIG. 14 is a diagram showing a first example of arrangement in the coil unit according to the embodiment.

FIG. 14 shows an example in which four resonance coils 111A to 111D are provided. In each of FIG. 14 and FIGS. 15 and 16 described below, the direction of winding of each resonance coil and the configuration of connection between the resonance coils are not shown in detail. However, the plurality of resonance coils are connected in series to each other, and the resonance coils, which face each other, electromagnetically resonate with each other, in the entire coil unit.

In FIG. 14, the four resonance coils 111A to 111D are disposed, for example, in a zigzag arrangement. That is, centers, around which the four resonance coils 111A to 111D are wound, are positioned on a quadrangle. The electromagnetic fields, which are generated by the coils disposed on one diagonal line of the quadrangle (for example, the resonance coils 111A and 111D), have the same phase. The electromagnetic fields, which are generated by the coils disposed on the other diagonal line of the quadrangle (for example, the resonance coils 111B and 111C) have the phase opposite to the phase of the electromagnetic fields generated by the resonance coils 111A and 111D.

The electromagnetic fields, which are generated by the resonance coils 111A and 111B, may have the same phase, and the electromagnetic fields, which are generated by the resonance coils 111C and 111D, may have the phase opposite to the phase of the electromagnetic fields generated by the resonance coils 111A and 111B. Also, the four resonance coils 111A to 111D may be disposed in a line in a manner such that the electromagnetic fields, which are generated by each pair of the resonance coils adjacent to each other, have phases opposite to each other.

Figure 15:
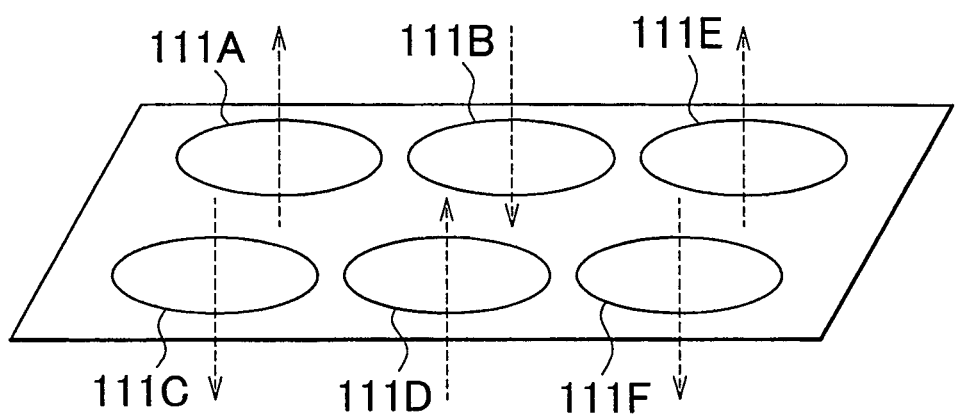
FIG. 15 is a diagram showing a second example of arrangement in the coil unit according to the embodiment.

FIG. 15 shows an example in which the coil unit includes six resonance coils 111A to 111F. In this case as well, for example, the resonance coils are disposed in a zigzag arrangement.

When an even number of resonance coils are disposed as shown in FIG. 14 and FIG. 15, the number of the coils that generate the electromagnetic fields with the same phase may be equal to the number of the coils that generate the electromagnetic fields with the opposite phase. In this case, the coils with the same shape can be disposed in a well-balanced arrangement.

Figure 16:
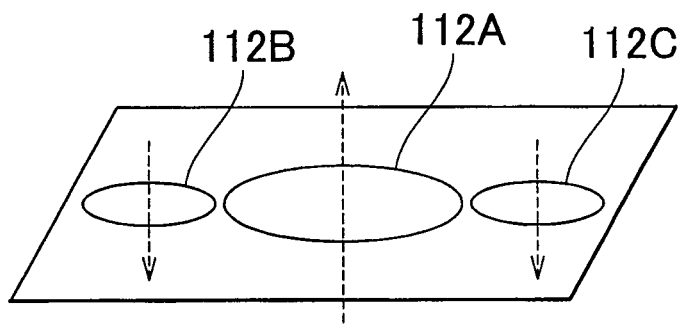
FIG. 16 is a diagram showing a third example of arrangement in the coil unit according to the embodiment.

As in an example in FIG. 16, an odd number of resonance coils (three coils in FIG. 16) may be disposed. FIG. 16 shows the example in which the coil unit includes resonance coils 112A to 112C. In this example, the resonance coils 112B and 112C are disposed on respective sides of the resonance coil 112A disposed at a center. The reactance of each coil, the number of turns of each coil, the direction of winding of each coil, and the configuration of connection between the coils are appropriately determined so that the electromagnetic fields, which are generated by the resonance coils 112B and 112C, have the phase opposite to the phase of the electromagnetic field generated by the resonance coil 112A, and the sum of the sizes of the electromagnetic fields generated by the resonance coils 112B and 112C is equal to the size of the electromagnetic field generated by the resonance coil 112A.

For example, in the case where the resonance coil is divided into "n" number of resonance coils, if an average power density per unit area is constant, the diameter of each coil becomes approximately $1/\sqrt{n}$. Because the distribution profile of the magnetic field is also reduced, the height of the shields, that is, the height of the coil unit also becomes $1/\sqrt{n}$. Therefore, it is possible to provide the coil unit with the decreased thickness. However, the spatial distribution of power transmission efficiency also becomes $1/\sqrt{n}$. Therefore, the distance that electric power can be transmitted (that is, a distance between a power transmission device and a power reception device) is also reduced. Therefore, the number of coils is limited by the design of the distance between the power transmission device and the power reception device.

Figure 17:
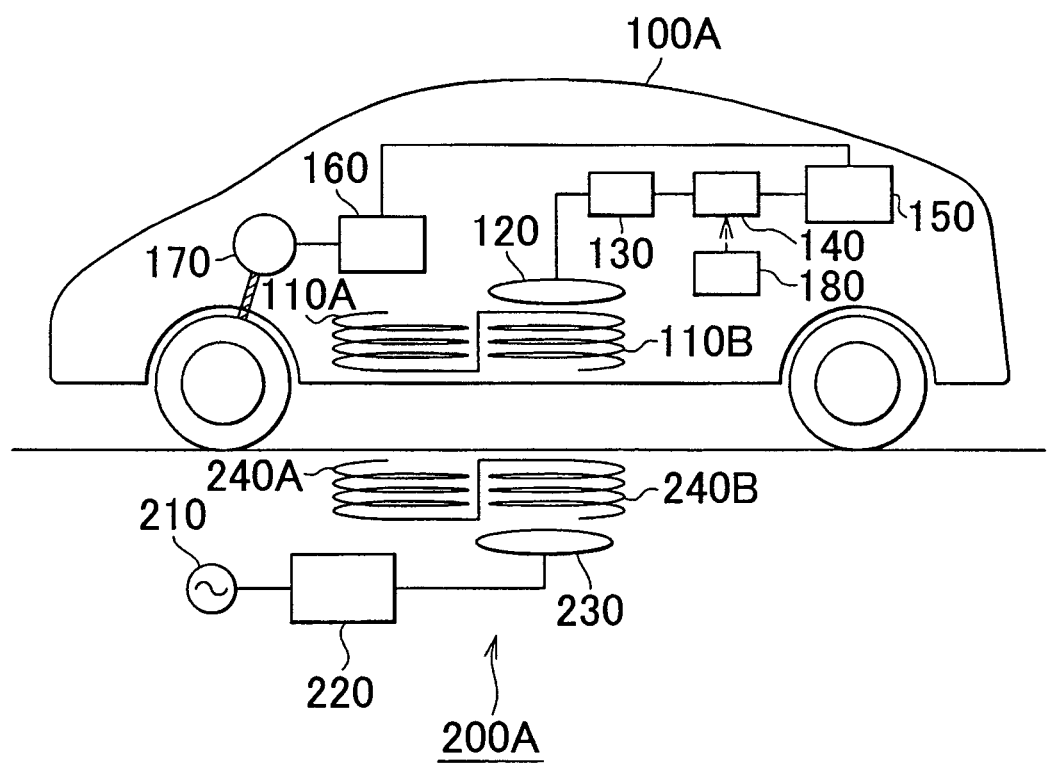
FIG. 17 is a diagram showing the entire configuration of the non-contact power supply system when the coil unit according to the embodiment is used in each of a vehicle and a power supply device.

FIG. 17 is a diagram showing the entire configuration of the non-contact power supply system in FIG. 1 when the coil unit shown in FIG. 13 is used in each of a power supply device and a vehicle.

In FIG. 17, in a vehicle 100A, the secondary resonance coils 110A and 110B in FIG. 13 are used instead of the secondary resonance coil 110 in the vehicle 100 in FIG. 1. In a power supply device 200A, the primary resonance coils 240A and 240B in FIG. 13 are used instead of the primary resonance coil 240 in the power supply device 200 in FIG. 1.

Figure 18:
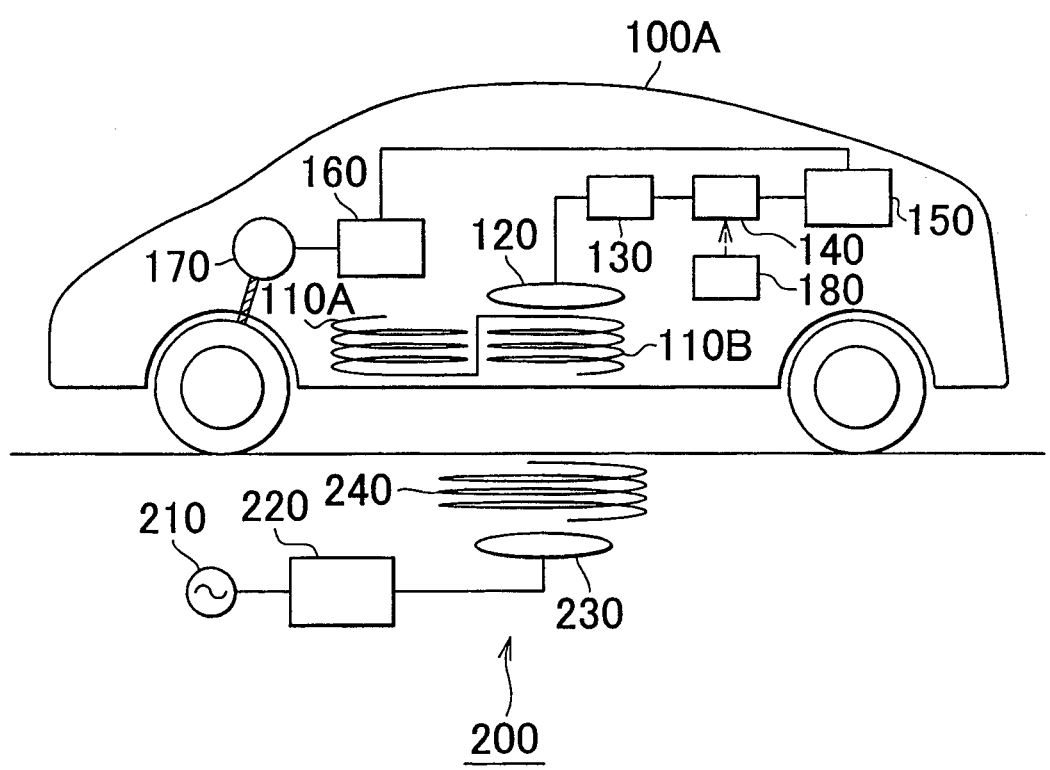
FIG. 18 is a diagram showing the entire configuration of the non-contact power supply system when the coil unit according to the embodiment is used in the vehicle.
Figure 19:
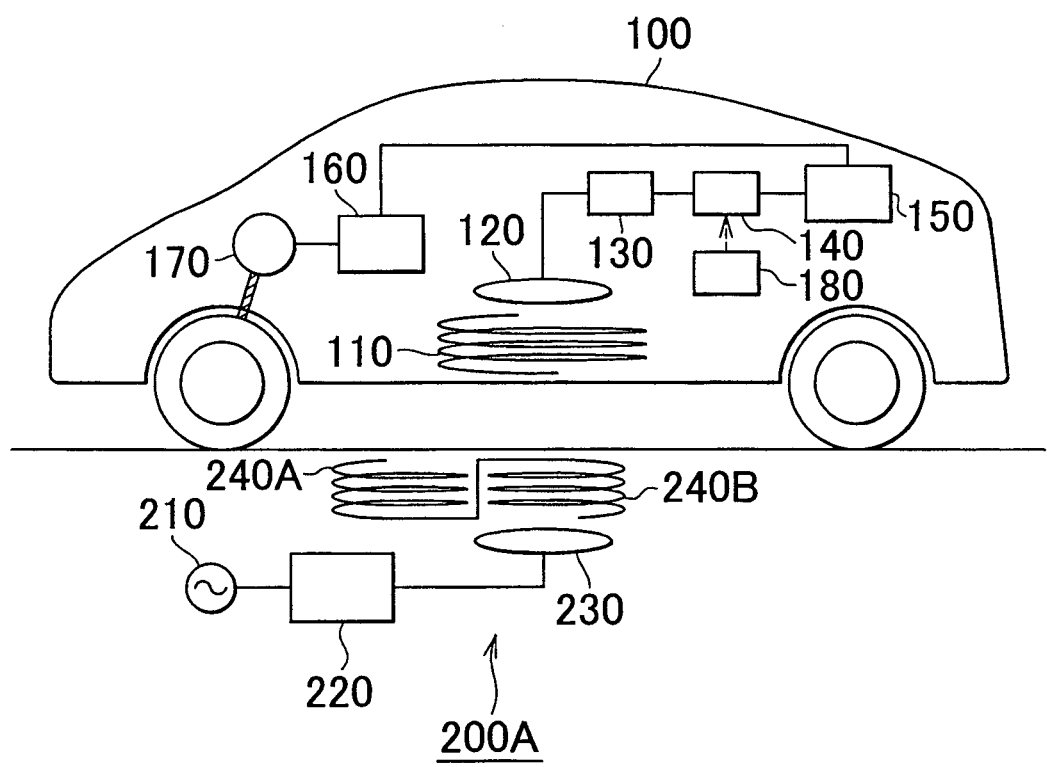
FIG. 19 is a diagram showing the entire configuration of the non-contact power supply system when the coil unit according to the embodiment is used in the power supply device.

FIG. 18 is a diagram showing the entire configuration of the non-contact power supply system when the coil unit 125A in FIG. 13 is used in the vehicle, and the coil unit 245A in FIG. 13 is not used in the power supply device. FIG. 19 is a diagram showing the entire configuration of the non-contact power supply system when the coil unit 245A in FIG. 13 is used in the power supply device, and the coil unit 125A in FIG. 13 is not used in the vehicle. The description of the elements in FIG. 17 to FIG. 19 that are shown in FIG. 1 to FIG. 13 will not be repeated.

In FIG. 18 and FIG. 19, one of the vehicle and the power supply device includes one resonance coil, and the other of the vehicle and the power supply device includes two resonance coils. In these cases as well, it is possible to transmit electric power using electromagnetic resonance, by making the resonance frequency of the entire coil unit including the capacitor and the two resonance coils substantially equal to the resonance frequency of the coil unit including the one resonance coil that faces the two resonance coils.

Further, recently, a so-called smart grid system has been examined. In the smart grid system, a vehicle is regarded as one electric power supply device for household use; a power storage device provided in the vehicle is charged with electric power generated at home using a solar battery or the like; and electric power stored in the power storage device in the vehicle is used at home, or is supplied to the system of a commercial power source for sale.

When electric power can be transmitted in two directions between the vehicle and the power supply device, that is, power can be transmitted from the vehicle to the power supply device and from the power supply device to the vehicle in the non-contact power supply system in the embodiment, the non-contact power supply system in the embodiment may be used in the smart grid system.

Figure 20:
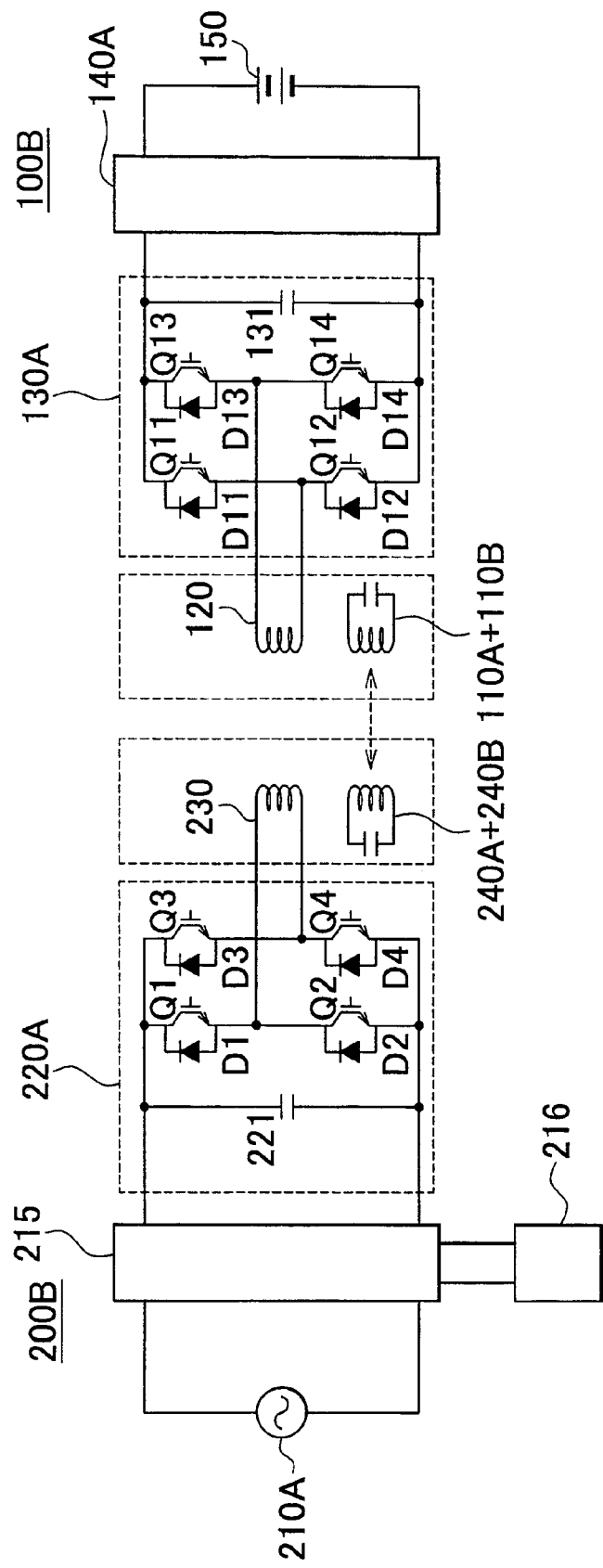
FIG. 20 is a diagram showing an example of a circuit of the non-contact power supply system in which electric power is transmitted in two directions between a vehicle and a power supply device.

FIG. 20 is a diagram showing an example of a circuit of the non-contact power supply system in which electric power can be transmitted in two directions between a vehicle and a power supply device. The description of the elements in FIG. 20 that are shown in FIG. 17 to FIG. 19 will not be repeated.

As shown in FIG. 20, the non-contact power supply system, in which electric power can be transmitted in two directions, includes a vehicle 100B and a power supply device 200B.

Basically, the vehicle 100B has the same configuration as the configuration of the vehicle 100A in FIG. 17. However, in the vehicle 100B, an inverter 130A, which can convert AC power to DC power, and can convert DC power to AC power, is used instead of the rectifier 130 in FIG. 17, and a DC-DC converter 140A is used instead of the DC-DC converter 140 in FIG. 17.

For example, the inverter 130A is a full-bridge type inverter, and includes switching elements Q11 to Q14, diodes D11 to D14, and a capacitor 131. When the power storage device 150 is charged, the inverter 130A converts AC power, which has been transmitted from the power supply device 200B by electromagnetic resonance, to DC power. When electric power stored in the power storage device 150 is supplied to the power supply device 200B, the inverter 130A converts DC power, which has been supplied from the power storage device 150, to AC power.

For example, the DC-DC converter 140A is configured to include a chopper circuit that steps up and steps down a voltage. The DC-DC converter 140A is disposed between the power storage device 150 and the inverter 130A to convert a voltage.

The power supply device 200B includes a power conditioner 215 and an inverter 220A. The power conditioner 215 adjusts a DC voltage generated by a solar battery 216, which is installed, for example, on the roof of a house, to a predetermined voltage, and then, supplies the DC voltage. The power conditioner 215 converts AC power, which has been supplied from a commercial power source 210A, to DC power, and supplies the DC power to the inverter 220A. Also, the power conditioner 215 converts DC power generated by the solar battery 216 or DC power supplied from the power storage device 150 provided in the vehicle 100B via the inverter 220A, to AC power, and supplies the AC power to the system of the commercial power source 210A.

For example, the inverter 220A is a full-bridge type inverter, as well as the inverter 130A in the vehicle 100B. Thus, the inverter 220A includes switching elements Q1 to Q4, diodes D1 to D4, and a capacitor 221. The inverter 220A converts DC power, which has been supplied from the power conditioner 215, to AC power, and supplies the AC power to the primary electromagnetic induction coil 230. The inverter 220A converts AC power, which has been transmitted from the vehicle 100B by electromagnetic resonance, to DC power, and supplies the DC power to the power conditioner 215.

By forming this circuit, electric power supplied from a commercial power source, or electric power generated using a solar battery can be transmitted by electromagnetic resonance to charge the power storage device provided in the vehicle, and in addition, electric power stored in the power storage device in the vehicle can be transmitted by electromagnetic resonance to be used at home, or to be supplied to the system of the commercial power source.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A coil unit that is provided in a vehicle or in a power supply device for a vehicle, and that performs at least one of transmission and reception of electric power using electromagnetic resonance between the coil unit and a primary resonance coil disposed to face the coil unit, the coil unit comprising
a secondary resonance coil that electromagnetically resonates with the primary resonance coil, wherein:
the secondary resonance coil includes a first coil and a second coil;
the first coil and the second coil have a same number of turns, a same coil diameter, and a same shape, the first coil and the second coil are electrically connected in series, and the first coil and the second coil are disposed in a manner such that directions of generated magnetic fields are opposite to each other; and
the first coil is disposed adjacent to the second coil on a plane perpendicular to the directions of the generated magnetic fields.

2. The coil unit according to claim 1, wherein
the first coil and the second coil are disposed in a manner such that a direction of winding of the first coil is opposite to a direction of winding of the second coil when the first coil and the second coil are seen from the primary resonance coil.

3. The coil unit according to claim 1, wherein
the first coil and the second coil are disposed in a manner such that a direction of winding of the first coil is the same as a direction of winding of the second coil when the first coil and the second coil are seen from the primary resonance coil.

4. The coil unit according to claim 1, wherein the first coil and the second coil have a substantially same reactance.

5. The coil unit according to claim 1, further comprising
an electromagnetic induction coil configured to perform at least one of transmission of electric power to the secondary resonance coil and reception of electric power from the secondary resonance coil, using electromagnetic induction, wherein
the electromagnetic induction coil is magnetically coupled with at least one of the first coil and the second coil.

6. The coil unit according to claim 1, wherein the coil unit is provided at a lower portion of the vehicle.

7. A coil unit that is provided in a vehicle or in a power supply device for a vehicle, and that performs at least one of transmission and reception of electric power using electromagnetic resonance between the coil unit and a primary resonance coil disposed to face the coil unit, the coil unit comprising
a secondary resonance coil that electromagnetically resonates with the primary resonance coil, wherein:
the secondary resonance coil includes a first coil and a second coil;
the first coil and the second coil have a same number of turns, a same coil diameter, and a same shape, the first coil and the second coil are electrically connected in series, and the first coil and the second coil are disposed in a manner such that directions of generated electric currents are opposite to each other; and
the first coil is disposed adjacent to the second coil on a plane perpendicular to directions of generated magnetic fields.

8. The coil unit according to claim 7, wherein
the first coil and the second coil are disposed in a manner such that a direction of winding of the first coil is opposite to a direction of winding of the second coil when the first coil and the second coil are seen from the primary resonance coil.

9. The coil unit according to claim 7, wherein
the first coil and the second coil are disposed in a manner such that a direction of winding of the first coil is the same as a direction of winding of the second coil when the first coil and the second coil are seen from the primary resonance coil.

10. The coil unit according to claim 7, wherein the first coil and the second coil have a substantially same reactance.

11. The coil unit according to claim 7, further comprising
an electromagnetic induction coil configured to perform at least one of transmission of electric power to the secondary resonance coil and reception of electric power from the secondary resonance coil, using electromagnetic induction, wherein
the electromagnetic induction coil is magnetically coupled with at least one of the first coil and the second coil.

12. The coil unit according to claim 7, wherein the coil unit is provided at a lower portion of the vehicle.

13. A coil unit that is provided in a vehicle or in a power supply device for a vehicle, and that performs at least one of transmission and reception of electric power using electromagnetic resonance between the coil unit and a primary resonance coil disposed to face the coil unit, the coil unit comprising
a secondary resonance coil that electromagnetically resonates with the primary resonance coil, wherein:
the secondary resonance coil includes a first coil and a second coil;
the first coil and the second coil have a same number of turns, a same coil diameter, and a same shape, the first coil and the second coil are electrically connected in series, and the first coil and the second coil are disposed in a manner such that phases of generated magnetic fields are opposite to each other; and
the first coil is disposed adjacent to the second coil on a plane perpendicular to directions of the generated magnetic fields.

14. The coil unit according to claim 13, wherein
the first coil and the second coil are disposed in a manner such that a direction of winding of the first coil is opposite to a direction of winding of the second coil when the first coil and the second coil are seen from the primary resonance coil.

15. The coil unit according to claim 13, wherein
the first coil and the second coil are disposed in a manner such that a direction of winding of the first coil is the same as a direction of winding of the second coil when the first coil and the second coil are seen from the primary resonance coil.

16. The coil unit according to claim 13, wherein the first coil and the second coil have a substantially same reactance.

17. The coil unit according to claim 13, further comprising an electromagnetic induction coil configured to perform at least one of transmission of electric power to the secondary resonance coil and reception of electric power from the secondary resonance coil, using electromagnetic induction, wherein the electromagnetic induction coil is magnetically coupled with at least one of the first coil and the second coil.

18. The coil unit according to claim 13, wherein the coil unit is provided at a lower portion of the vehicle.

19. A non-contact power supply system for non-contact transmission of electric power, the non-contact power supply system comprising:

a power transmission device; and a power reception device that is provided in a vehicle, and that faces the power transmission device, wherein:

the power transmission device includes a primary resonance coil that is configured to supply electric power, which has been supplied from a power source device, to the power reception device using electromagnetic resonance between the primary resonance coil and the power reception device;

the primary resonance coil includes a first transmission coil and a second transmission coil;

the first transmission coil and the second transmission coil have a same number of turns, a same coil diameter, and a same shape, the first transmission coil and the second transmission coil are electrically connected in series, and the first transmission coil and the second transmission coil are disposed in a manner such that directions of magnetic fields generated by electric power supplied from the power source device are opposite to each other;

the first transmission coil is disposed adjacent to the second transmission coil on a plane perpendicular to the directions of the generated magnetic fields;

the power reception device includes a secondary resonance coil that is configured to receive electric power from the power transmission device using electromagnetic resonance between the secondary resonance coil and the primary resonance coil;

the secondary resonance coil includes a first reception coil and a second reception coil;

the first reception coil and the second reception coil have a same number of turns, a same coil diameter, and a same shape, the first reception coil and the second reception coil are electrically connected in series, and the first reception coil and the second reception coil are disposed in a manner such that directions of magnetic fields generated by electric power received from the power transmission device are opposite to each other; and the first reception coil is disposed adjacent to the second reception coil on a plane perpendicular to the directions of the generated magnetic fields.

20. The non-contact power supply system according to claim 19, wherein the first and second power transmission coils and the first and second power reception coils are disposed in a manner such that the direction of the magnetic field generated by the first power transmission coil is the same as the direction of the magnetic field generated by a corresponding one of the first and the second power reception coils, which faces the first power transmission coil, and the direction of the magnetic field generated by the second power transmission coil is the same as the direction of the magnetic field generated by a corresponding one of the first and second power reception coils, which faces the second power transmission coil.

21. A non-contact power supply system for non-contact transmission of electric power, the non-contact power supply system comprising:

a power transmission device; and a power reception device that is provided in a vehicle, and that faces the power transmission device, wherein:

the power transmission device includes a primary resonance coil that is configured to supply electric power, which has been supplied from a power source device, to the power reception device using electromagnetic resonance between the primary resonance coil and the power reception device;

the primary resonance coil includes a first transmission coil and a second transmission coil;

the first transmission coil and the second transmission coil have a same number of turns, a same coil diameter, and a same shape, the first transmission coil and the second transmission coil are electrically connected in series, and the first transmission coil and the second transmission coil are disposed in a manner such that directions of electric currents generated by electric power supplied from the power source device are opposite to each other;

the first transmission coil is disposed adjacent to the second transmission coil on a plane perpendicular to directions of generated magnetic fields;

the power reception device includes a secondary resonance coil that is configured to receive electric power from the power transmission device using electromagnetic resonance between the secondary resonance coil and the primary resonance coil;

the secondary resonance coil includes a first reception coil and a second reception coil;

the first reception coil and the second reception coil have a same number of turns, a same coil diameter, and a same shape, the first reception coil and the second reception coil are electrically connected in series, and the first reception coil and the second reception coil are disposed in a manner such that directions of electric currents generated by electric power received from the power transmission device are opposite to each other; and the first reception coil is disposed adjacent to the second reception coil on a plane perpendicular to directions of generated magnetic fields.

22. The non-contact power supply system according to claim 21, wherein the first and second power transmission coils and the first and second power reception coils are disposed in a manner such that the direction of the magnetic field generated by the first power transmission coil is the same as the direction of the magnetic field generated by a corresponding one of the first and the second power reception coils, which faces the first power transmission coil, and the direction of the magnetic field generated by the second power transmission coil is the same as the direction of the magnetic field generated by a corresponding one of the first and second power reception coils, which faces the second power transmission coil.

23. A non-contact power supply system for non-contact transmission of electric power, the non-contact power supply system comprising:

a power transmission device; and a power reception device that is provided in a vehicle, and that faces the power transmission device, wherein:

the power transmission device includes a primary resonance coil that is configured to supply electric power, which has been supplied from a power source device, to the power reception device using electromagnetic resonance between the primary resonance coil and the power reception device;

the primary resonance coil includes a first transmission coil and a second transmission coil;

the first transmission coil and the second transmission coil have a same number of turns, a same coil diameter, and a same shape, the first transmission coil and the second transmission coil are electrically connected in series, and the first transmission coil and the second transmission coil are disposed in a manner such that phases of magnetic fields generated by electric power supplied from the power source device are opposite to each other;

the first transmission coil is disposed adjacent to the second transmission coil on a plane perpendicular to directions of the generated magnetic fields;

the power reception device includes a secondary resonance coil that is configured to receive electric power from the power transmission device using electromagnetic resonance between the secondary resonance coil and the primary resonance coil;

the secondary resonance coil includes a first reception coil and a second reception coil;

the first reception coil and the second reception coil have a same number of turns, a same coil diameter, and a same shape, the first reception coil and the second reception coil are electrically connected in series, and the first reception coil and the second reception coil are disposed in a manner such that phases of magnetic fields generated by electric power received from the power transmission device are opposite to each other; and the first reception coil is disposed adjacent to the second reception coil on a plane perpendicular to directions of the generated magnetic fields.

24. The non-contact power supply system according to claim 23, wherein the first and second power transmission coils and the first and second power reception coils are disposed in a manner such that the direction of the magnetic field generated by the first power transmission coil is the same as the direction of the magnetic field generated by a corresponding one of the first and the second power reception coils, which faces the first power transmission coil, and the direction of the magnetic field generated by the second power transmission coil is the same as the direction of the magnetic field generated by a corresponding one of the first and second power reception coils, which faces the second power transmission coil.

* * * * *